United States Patent
Raman et al.

(10) Patent No.: US 12,052,092 B1
(45) Date of Patent: Jul. 30, 2024

(54) SYSTEMS AND METHODS FOR HIGH AVAILABILITY NODE PAIRING WITHOUT INCURRING CONNECTION DROPS

(71) Applicant: Pensando Systems Inc., Milpitas, CA (US)

(72) Inventors: Balakrishnan Raman, Fremont, CA (US); Krishna Doddapaneni, Cupertino, CA (US); Pirabhu Raman, Fremont, CA (US); Sarat Kamisetty, Fremont, CA (US); Akshaya Nadahalli, Bangalore (IN); Rathina Sabapathy Sabesan, Bengaluru (IN); Prabu Thayalan, Bangalore (IN); Dontula Venkata Ratnananda Ganesh, Dublin, CA (US)

(73) Assignee: Pensando Systems Inc., Milpitas, CA (US)

( * ) Notice: Subject to any disclaimer, the term of this patent is extended or adjusted under 35 U.S.C. 154(b) by 0 days.

(21) Appl. No.: 18/341,716

(22) Filed: Jun. 26, 2023

(51) Int. Cl.
*H04J 3/06* (2006.01)
*H04L 67/141* (2022.01)

(52) U.S. Cl.
CPC .......... *H04J 3/0638* (2013.01); *H04L 67/141* (2013.01)

(58) Field of Classification Search
CPC .............................. H04L 67/141; H04J 3/0638
See application file for complete search history.

(56) References Cited

U.S. PATENT DOCUMENTS

| 11,182,150 | B2 | 11/2021 | Rathore et al. |
| 11,652,749 | B2 | 5/2023 | Degrace et al. |
| 2022/0091870 | A1* | 3/2022 | Khan .................. G06F 8/656 |
| 2022/0377013 | A1 | 11/2022 | Doddapaneni et al. |
| 2022/0407775 | A1* | 12/2022 | Khan .................. H04L 45/28 |
| 2023/0069844 | A1 | 3/2023 | Chandrasekaran et al. |

OTHER PUBLICATIONS

P4, "P4 Language Tutorial", 2017, 55 pgs.
Sivaraman, Anirudh et al. "DC.p4: Programming the Forwarding Plane of a Data-Center Switch", 2015, 8 pgs.

\* cited by examiner

*Primary Examiner* — Benjamin M Thieu
(74) *Attorney, Agent, or Firm* — LOZA & LOZA, LLP; Richard H. Krukar

(57) ABSTRACT

HA peers can include networking devices that have data planes and control planes that configure the data plane to use status data in a memory for processing network packets of network flows. The HA peers synchronize the status data such that one peer can take over when another fails. When a HA peer is brought up, data plane syncing synchronizes data for new network flows but not existing network flows. A first bulk sync operation synchronizes data for existing flows but not for new flows. A second bulk sync operation can synchronize the data for flows that changed state during the first bulk sync operation. Data plane syncing can sync data for all flows after the first bulk sync operation.

20 Claims, 22 Drawing Sheets

SYSTEMS AND METHODS FOR HIGH AVAILABILITY NODE PAIRING WITHOUT INCURRING CONNECTION DROPS

TECHNICAL FIELD

The descriptions and drawings relate to computer networks, local area networks, networking devices such as a router, a switch, a network interface card (NIC), a smartNIC, and a distributed service card (DSC). The descriptions and drawings also relate to elements of networking devices such as semiconductor chips implementing packet processing pipeline circuits, match-action pipelines, and to using match-action pipelines circuits in data planes for syncing network flow data simultaneously with bulk sync operations performed by the control plane.

BACKGROUND

Networking devices process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a networking device. The P4 domain-specific language for programming the data plane of networking devices has been defined in the "$P4_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads that offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a networking device. The networking device can include a packet processing pipeline circuit configured to implement a data plane, and a processor configured to implement a control plane. The packet processing pipeline circuit and the processor can be further configured to implement synchronization of status data that involves the data plane initiating data plane syncing with a second networking device upon establishing a connection with the second networking device, the control plane performing a first bulk sync operation when the connection is established, and the control plane performing a second bulk sync operation to synchronize changes in the status data that occurred during the first bulk sync operation.

Another aspect of the subject matter described in this disclosure can be implemented by a networking device. The networking device can include a packet processing pipeline circuit configured to implement a data plane, and a processor configured to implement a control plane. The packet processing pipeline circuit and the processor are further configured to implement synchronization of a flow table that involves storing status data for a plurality of network flows in the flow table, the data plane initiating data plane syncing with a second networking device upon establishing a connection with the second networking device, the control plane performing a first bulk sync operation with the second networking device when the connection is established, and the control plane performing a second bulk sync operation to synchronize changes in the status data that occurred during the first bulk sync operation.

Yet another aspect of the subject matter described in this disclosure can be implemented by a method. The method can include storing status data for a plurality of network flows in a flow table, initiating data plane syncing with a networking device upon establishing a connection with the networking device, performing a first bulk sync operation with the networking device when the connection is established, and performing a second bulk sync operation to synchronize changes in the status data that occurred during the first bulk sync operation, wherein a packet processing pipeline circuit is configured to implement a data plane that performs the data plane syncing, and a processor is configured to implement a control plane that performs the first bulk sync operation and the second bulk sync operation.

In some implementations of the methods and systems, data plane syncing includes sending a data plane sync packet to the second networking device, the data plane sync packet including the status data of a network flow. In some implementations of the methods and systems, data plane syncing includes receiving a data plane sync packet that includes the status data of a network flow, and the data plane is configured to store the status data of the network flow in a flow table entry in a flow table. In some implementations of the methods and systems, the control plane is configured to use the first bulk sync operation and the second bulk sync operation to store the status data for a plurality of network flows in a plurality of flow table entries in a flow table. In some implementations of the methods and systems, a global pairing epoch indicator indicates a current pairing epoch, the status data for a network flow indicates a pairing epoch, and the first bulk sync operation synchronizes the status data for the network flow when the current pairing epoch is more recent than the pairing epoch.

In some implementations of the methods and systems, data plane syncing includes sending data plane sync packets to the second networking device, and the data plane sync packets that are sent during or after the first bulk sync operation indicate a second pairing epoch that is more recent than the pairing epoch. In some implementations of the methods and systems, a data plane sync packet is sent to the second networking device before the first bulk sync operation begins. In some implementations of the methods and systems, data plane syncing includes sending data plane sync packet to the second networking device before, during, and after the first bulk sync operation. In some implementations of the methods and systems, data plane syncing includes sending data plane sync packet to the second networking device before, during, and after the second bulk sync operation. In some implementations of the methods and systems, a state change of a network flow during the first bulk sync operation is not synchronized via data plane syncing when the network flow was established before the connection is established. In some implementations of the methods and systems, a second state change of the network flow during the second bulk sync operation is synchronized via data plane synchronization. In some implementations of the methods and systems, data plane syncing synchronizes the status data of a plurality of network flows that are established after the connection is established.

In some implementations of the methods and systems, the networking device is configured to set a global pairing epoch indicator to a new value after establishing the connection, the status data includes a plurality of flow pairing epoch indicators for a plurality of network flows, network flows that predate setting the global pairing epoch indicator to the new value are identified by comparing the global pairing epoch indicator and the flow pairing epoch indicators, the first bulk sync operation synchronizes the status data for the network flows that predate setting the global pairing epoch indicator to the new value, and the first bulk sync operation does not synchronize the status data for the network flows that do not predate setting the global pairing epoch indicator to the new value. In some implementations of the methods and systems, before, during, and after the first bulk sync operation, the packet processing pipeline circuit is configured to use data plane sync packets to synchronize the status data for the network flows that do not predate setting the global pairing epoch indicator to the new value. In some implementations of the methods and systems, the network device is configured to enter a high availability mode upon completion of the second bulk sync operation.

In some implementations of the methods and systems, the networking device is configured to process the network flows in a standalone mode before the connection is established. In some implementations of the methods and systems, the networking device enters a high availability mode upon completion of the second bulk sync operation. In some implementations of the methods and systems, the method further includes entering an active mode or a standby mode after the second bulk sync operation.

These and other aspects will become more fully understood upon a review of the detailed description, which follows. Other aspects, features, and characteristics will become apparent to those of ordinary skill in the art, upon reviewing the following description of specific, examples in conjunction with the accompanying figures. While features may be discussed relative to certain examples and figures below, all examples may include one or more of the advantageous features discussed herein. In other words, while one or more examples may be described as having certain advantageous features, one or more of such features may be included any of the examples discussed herein. In similar fashion, while the examples may be discussed below as a device, a system, or a method, the examples may be implemented in various devices, systems, and methods.

DETAILED DESCRIPTION

Figure 1:
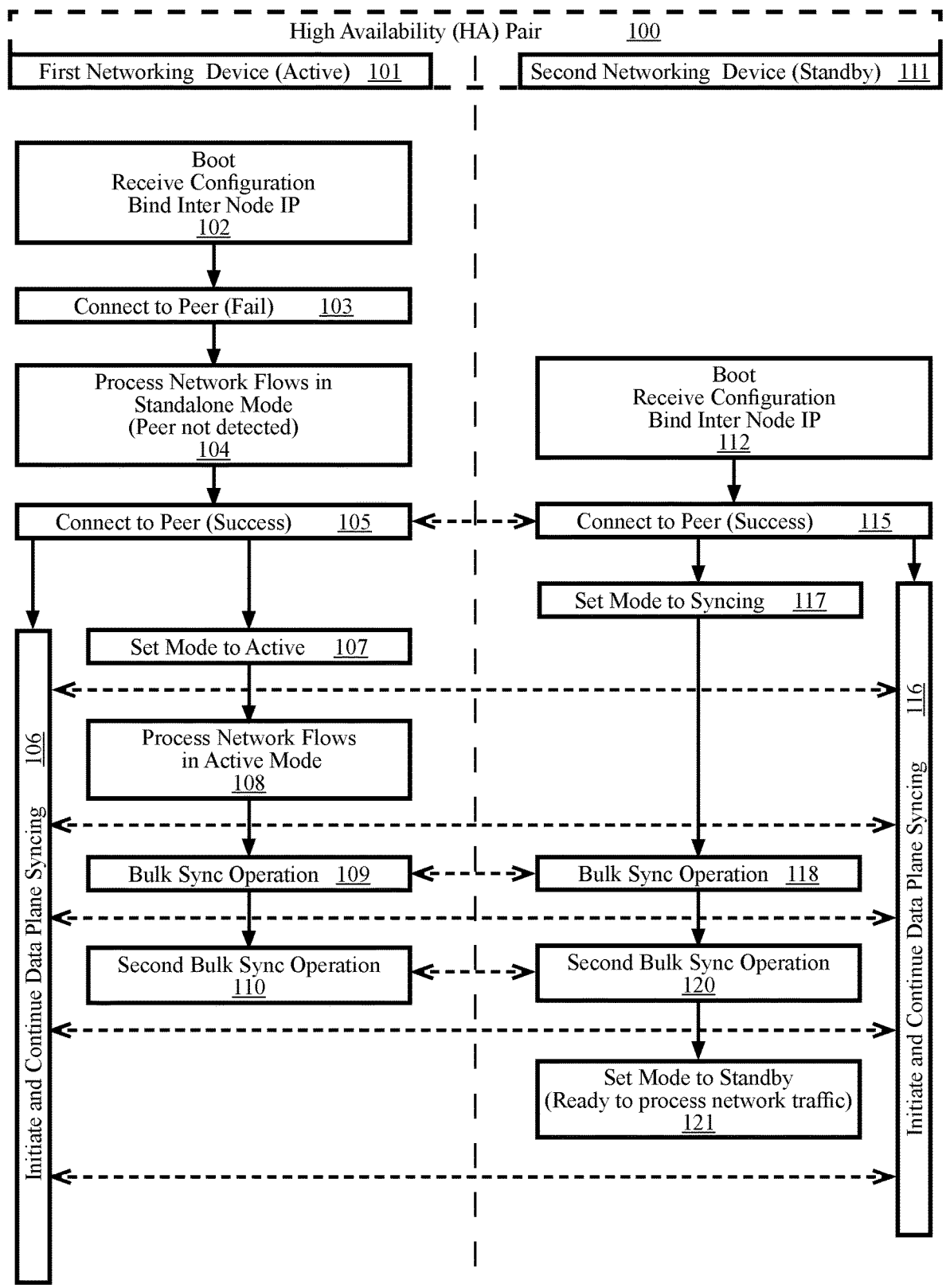
FIG. 1 is a high-level conceptual diagram of bringing up a high availability (HA) active node and a HA standby node according to some aspects.

Throughout the description, similar reference numbers may be used to identify similar elements.

It will be readily understood that the examples and aspects of the examples generally described herein and illustrated in the appended figures could be arranged and designed in a wide variety of different configurations. Thus, the following more detailed description and the figures are not intended to limit the scope of the present disclosure, but merely present illustrative examples. The drawings are not necessarily drawn to scale unless specifically indicated. The described examples are to be considered in all respects only as illustrative and not restrictive. The scope of the claims is therefore indicated by the claims themselves rather than this detailed description or the drawings. All changes which come within the meaning and range of equivalency of the claims are to be embraced within their scope.

Reference throughout this specification to features, advantages, or similar language does not imply that all the features and advantages that may be realized should be or must be in any single example. Rather, language referring to the features and advantages is understood to mean that a specific feature, advantage, or characteristic described in an example is included in that example and possibly in other examples. Thus, discussions of the features and advantages, and similar language, throughout this specification may, but do not necessarily, refer to the same example.

Furthermore, the described features, advantages, characteristics, and aspects may be combined in any suitable manner in one or more example. One skilled in the relevant art will recognize, in light of the description herein, that one or more of the features, advantages, characteristics, or aspects may be omitted from some examples. Other examples may include additional features and advantages.

In the field of data networking, the functionality of networking devices such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. A match-action pipeline has a series of match-action stages. Upon receiving a packet of a network traffic flow, the first match-action stage of a match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action stage can perform a default action. Match-action stages may pass the packet to a subsequent match-action stage in the match-action pipeline.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

During node pairing for high availability, a first networking device may already have status data for existing network flows, can be actively creating status data for new network flows that are being established, and can be changing the status data for existing network flows due to changes in the network device's configuration (e.g., routing policies, firewall policies, HA policies, etc.). The first networking device may pair up with a second networking device that is coming online for high availability (HA). During HA pairing, all the states for the existing and new network flows should be synced, including the changes in states that may occur. Once the second networking device is at the same level as the first networking device, it can declare itself to be a HA peer of the first networking device. The networking devices may then be an HA pair. The state for an existing network flow or connection may change if the connection goes through a connection termination process, if there is any configuration change that requires the connection to be fixed up, or due to some other event or process.

The networking devices can be synced using multi-pass state synchronization that includes data plane synchronization, a first bulk sync operation, and a second bulk sync operation. The control planes of the networking devices can perform the bulk sync operations while, at the same time, the data planes of the networking devices perform data plane synchronization. Normally, but not during the first bulk sync operation, data plane syncing is used to synchronize the status data for all the network flows at the data path rate of packet processing pipeline circuits (e.g., P4 packet processing pipeline circuits) in the networking devices. The first bulk sync operation synchronizes existing network flows. During the first bulk sync operation, data plane syncing only synchronizes new network flows, not existing network flows. As such, data plane syncing and the first bulk sync operation do not attempt to synchronize the same flows, thereby avoiding race conditions and issues that can occur when data plane synchronization attempts to update a flow table entry that does not exist. However, the second networking device may lack the most current status data for existing flows that changed state during the first bulk sync operation. A second bulk sync operation can synchronize such flows.

This technique avoids race conditions that may occur during synchronization where the data plane of the second networking device drops the sync message for a network flow when the status data for the network flow does not yet exist in the second networking device. For example, the state of an existing flow may change during the first pass. Normally, such as when the network devices are synced, the state change is synced by the data planes using data plane sync packets. The synchronization fails when the second networking device does not already have status data for the network flow. However, the status data for that network flow does exist in the first node and changes in the first node. As such, after the first pass the network flow's status data in the second networking device is no longer current and is therefore considered stale. After the first pass, the second networking device has status data for all the network flows, whether previously existing or new. As such, subsequent passes of the multi-pass sync do not have the race condition.

One advantage of the technique is that data plane syncing of new network flows can begin immediately. Data plane syncing occurs when the data plane (e.g., a P4 pipeline circuit) in one networking device assembles and sends data plane sync packets to another networking device that has a data plane (e.g., another P4 pipeline circuit) that uses the data plane sync packets to create and update status data for networking flows. Data plane syncing can be exceptionally fast and efficient when it leverages the capabilities of packet processing pipeline circuits. The data planes may sync all the state changes that occur after the first pass. As such, the two networking devices may be completely synced after just two passes of the control plane's multi-pass sync.

FIG. 1 is a high-level conceptual diagram of bringing up a high availability (HA) active node and a HA standby node according to some aspects. A HA pair 100 has an active node and a standby node. The first network device 101 will be the active node after it enters active mode. The second networking device 111 will be the standby node after it enters standby mode. At block 102, when the first networking device 101 first starts up, the first networking device can boot up, receive its configuration, and bind its internode internet protocol (IP) address. The first networking device becomes reachable by peer devices when it binds its internode internet protocol (IP) address and can therefore begin sending and receiving network traffic at that IP address. A configuration may be stored in a network device's non-volatile memory or may be obtained from a centralized controller that is responsible for configuring a plethora of networking devices. The internode IP address can be the IP address on a network that the networking device uses to communicate with other networking devices. For example, the switches and routers of a data center may all communicate on a management or control network that carries communications for configuring and maintaining networking infrastructure. At block 103, the first networking device 101 attempts to establish a connection to the second networking device 111, but the second networking device has not started and the connection attempt fails. At block 104, the first networking device enters standalone mode and initiates processing the network flows in standalone mode. The first networking device enters standalone mode when it has no connection to the second networking device after block 103, but may otherwise enter into or remain in a different mode (e.g., active mode, standby mode). A networking device in standalone mode can process network flows but does not synchronize the state of those flows with HA peer devices. While running in standalone mode, the first network device stores status data for the network flows that it is processing.

At block 112, when the second networking device 111 first starts up, the second networking device can boot up, receive its configuration, and bind its internode internet protocol (IP) address. The second networking device becomes reachable by peer devices when it binds its internode internet protocol (IP) address and may therefore begin sending and receiving network traffic at that IP address. At block 115, the second network device tries to establish a connection to the first networking device 101 and succeeds. At block 115 the second networking device connects to the first networking device while at block 105 the first networking device connects to the second networking device. As soon as the connection is established, the second networking device may enter syncing mode 117. As soon as it enters syncing mode, the second networking device 111 may initiate and continue data plane syncing 116. Once the connection is established, the first networking device 101 may set its mode to active 107. The first networking device is now processing the network flows in active mode 108. The first networking device 101 may initiate and continue data plane syncing 106. In general, the networking device performs data plane syncing except when in standalone mode. The networking devices may now perform a first bulk sync operation. At block 109, the first networking device performs the send side of the first bulk sync operation. At block 119, the second networking device performs the receive side of the first bulk sync operation. During this first bulk sync operation at block 109, the first networking device synchronizes the state data only for new network flows via the data planes. After this first bulk sync operation, the networking devices may synchronize the state data for all network flows via the data planes. The networking devices can perform a second bulk sync operation after the first bulk sync operation. At block 110, the first networking device performs the send side of the second bulk sync operation. At block 120, the second networking device performs the receive side of the second bulk sync operation. The networking devices can perform data plane syncing before, during and after the second bulk sync operation. At block 121, the second networking device can enter standby mode by setting its mode to standby. The HA pair 100 now has the first networking device 101 in active mode and the second networking device 111 in standby mode.

Figure 2:
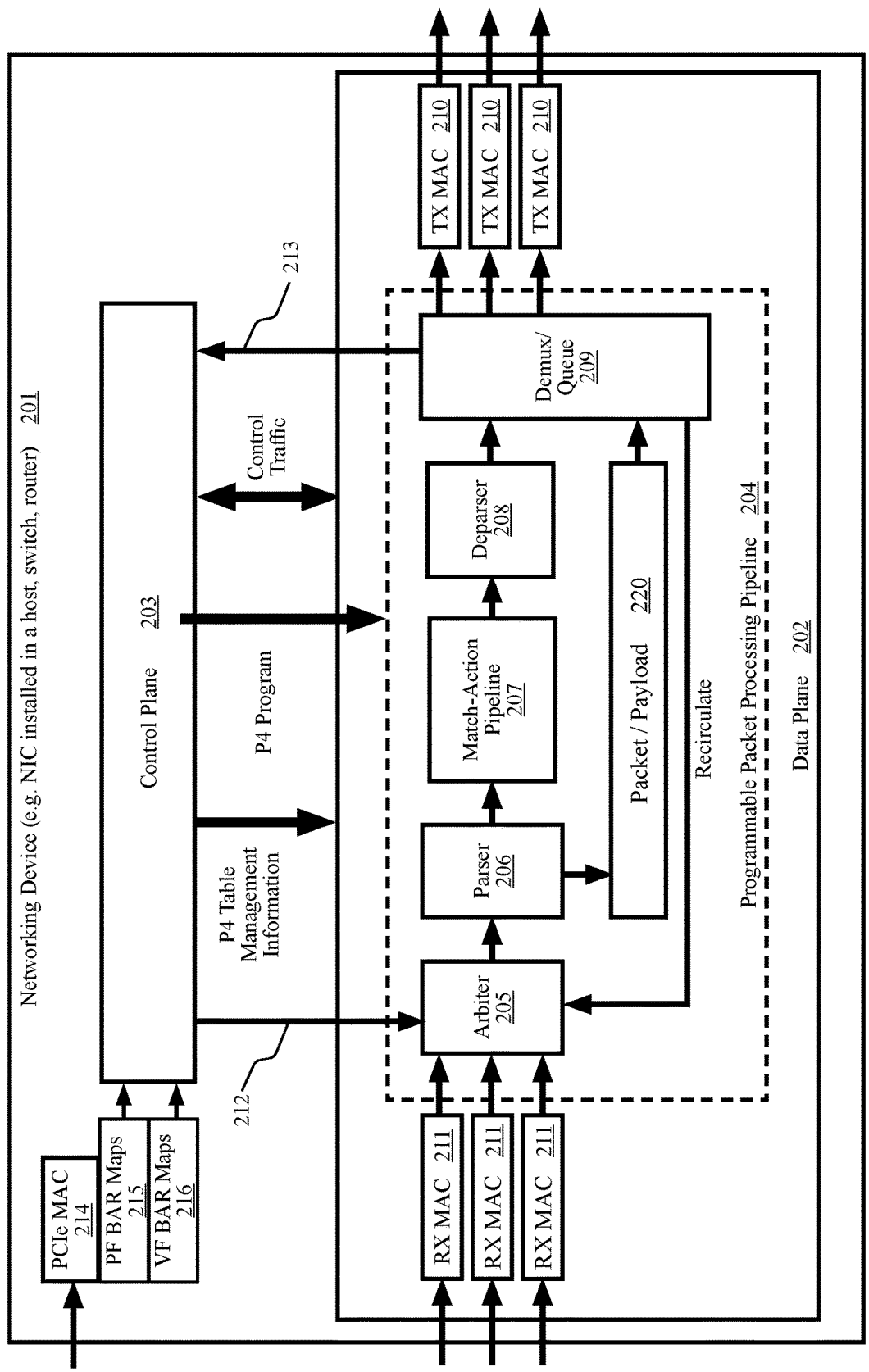
FIG. 2 is a functional block diagram of a networking device having a control plane and a data plane and in which aspects may be implemented.

FIG. 2 is a functional block diagram of a networking device having a control plane and a data plane and in which aspects may be implemented. A networking device 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," has developed as a way to provide some flexibility at the data plane of a networking device. The document "P4$_{16}$ Language Specification," version 1.2.2, published by the P4 Language Consortium on May 17, 2021, which is incorporated by reference herein, describes the P4 domain-specific language that can be used for programming the data plane of networking devices. P4 (also referred to herein as the "P4 specification," the "P4 language," and the "P4 program") is designed to be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission, and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The control plane is often referred to as a CPU although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniB and protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a MC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniB and channel adapter via another PF. As such, the NIC can provide "NIC' VFs and "InfiniBand" VFs to VMs running on the host. The Infini-Band PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
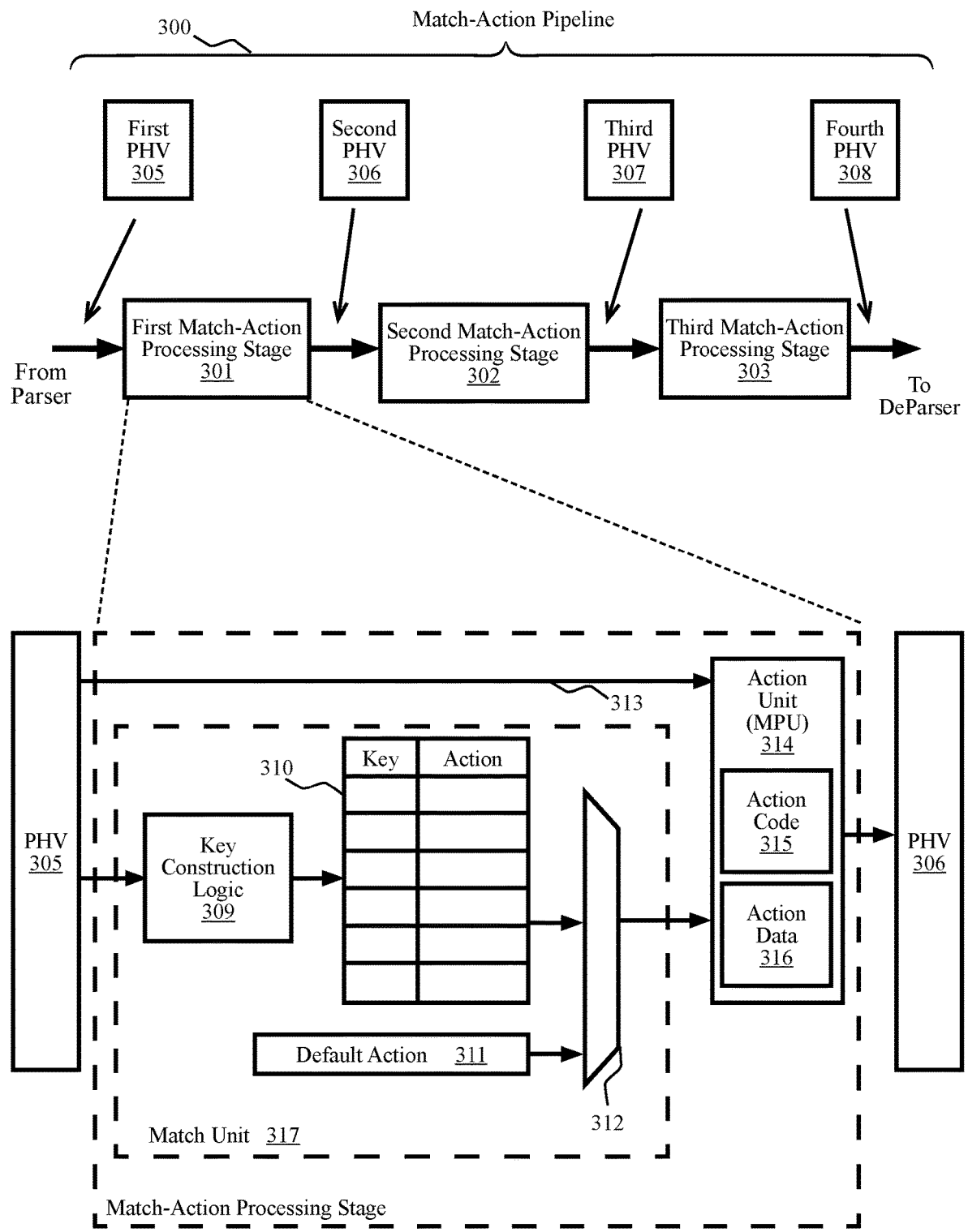
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stages can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308. The match-action processing stages are arranged as a match-action pipeline that passes the PHVs from one match-action processing stage to the next match-action processing stage in the pipeline.

An expanded view of elements of a match-action processing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table can be managed by the control plane.

Figure 4:
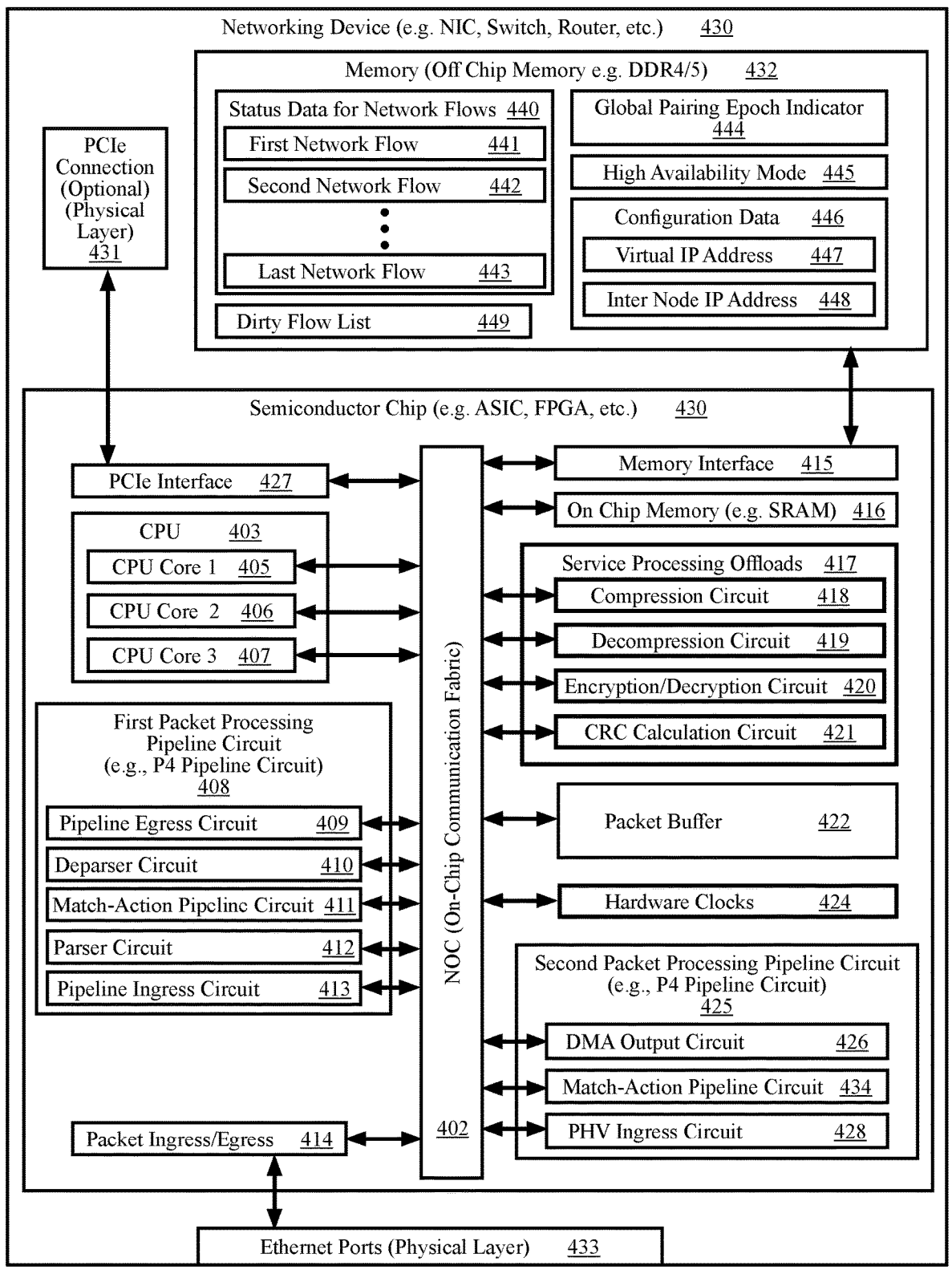
FIG. 4 is a functional block diagram of a networking device having a semiconductor chip such as an application specific integrated circuit (ASIC) or field programmable gate array (FPGA), according to some aspects.

FIG. 4 is a functional block diagram of a networking device 430 having a semiconductor chip 401 such as an ASIC or FPGA, according to some aspects. The semiconductor chip 401 shows a single semiconductor chip implementing a large number of hardware functions. A different and substantially equivalent implementation may employ a chiplet architecture. If the networking device is a network interface card (NIC) then the NIC can be installed in a host computer and can act as a networking device for the host computer and for virtual machines running on the host computer. Such a NIC can have a PCIe connection 431 for communicating with the host computer via a host PCIe connection. The networking device 430 can have a semiconductor chip 401, off chip memory 432, and ethernet ports 433. The off-chip memory 432 can be one of the widely available memory modules or chips such as double data rate 5 (DDR5) synchronous dynamic random-access memory (SDRAM) such that the semiconductor chip 401 has access to many gigabytes of memory on the networking device 430. The ethernet ports 433 provide physical connectivity to a computer network such as the internet. The NIC can include a printed circuit board to which the semiconductor chip 401 and the memory 432 are attached.

The semiconductor chip can have many core circuits interconnected by an on-chip communications fabric, sometimes called a network on a chip (NOC) 402. NOCs are often implementations of standardized communications fabrics such as the widely used advanced extensible interface (AXI) bus. The semiconductor chip's core circuits can include a PCIe interface 427, CPU 403, first packet processing pipeline circuit 408, memory interface circuit 415, on chip memory such as static random access memory (SRAM) 416, service processing offloads 417, a packet buffer 422, metering circuit 423, and packet ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The first packet processing pipeline circuit 408 can include a pipeline ingress circuit 413, a parser circuit 412, match-action pipeline circuit 411, a deparser circuit 410, and a pipeline egress circuit 409. The second packet processing pipeline circuit 425 can include a PHV ingress circuit 428, a match-action pipeline circuit 434, and a direct memory access (DMA)

output circuit 426. The service processing offloads 417 are circuits implementing functions that the semiconductor chip uses so often that the designer has chosen to provide hardware for offloading those functions from the CPU. The service processing offloads can include a compression circuit 418, decompression circuit 419, an encryption/decryption circuit 420, and a general use CRC calculation circuit 421. The general use CRC calculation circuit 421 can calculate digest values for data blocks. For example, the general use CRC calculation circuit 421 can calculate Ethernet FCS values. The specific core circuits implemented within the non-limiting example of the semiconductor chip 401 can be selected such that the semiconductor chip implements many, perhaps all, of the functionality of an InfiniBand channel adapter, of an NVMe card, and of a networking device that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The first packet processing pipeline circuit 408 is a specialized set of elements for processing PHVs including PHVs for network packets such as internet protocol (IP) packets and InfiniBand protocol data units (PDUs). The first packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 is a specialized set of elements for processing PHVs including PHVs for network packets such as internet protocol (IP) packets and InfiniBand protocol data units (PDUs). The second packet processing pipeline circuit 425 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store status data for network flows 440, a global pairing epoch indicator 444, a high availability mode 445, configuration data 446, and a dirty flow list 449. The status data for network flows can include status data for a first network flow 441, status data for a second network flow 442, and status data for a last network flow 443. An epoch indicator such as the global pairing epoch indicator 444 or a flow pairing epoch indicator (described elsewhere) can indicate a pairing epoch such as a first pairing epoch, a second pairing epoch, a third pairing epoch, etc. The global pairing epoch indicator 444 can indicate which pairing epoch is the current pairing epoch. The current pairing epoch is the pairing epoch at the current time. An epoch indicator may be a timestamp, an integer or some other value that may be used to determine if a one pairing epoch is more recent than another pairing epoch. The high availability mode indicator 445 indicates what HA mode the networking device is in such as standalone, syncing, active, and standby. The configuration data can include a virtual IP address 447 and an internode IP address 448. A virtual IP (VIP) address is an IP address that is assigned to an HA pair. When a node is the active node, it receives traffic directed to the VIP. When the active node fails, the standby node takes over and begins receiving traffic directed to the VIP. In this manner, other devices simply direct traffic to the VIP and do not need to know which node in the HA pair is the active node. The internode IP address 448 is the IP address that the networking device has on a network that networking devices use to communicate with one another. An HA peer device can use a node's internode IP address for establishing a connection with the node. The dirty flow list 449 may be used for track network flows that change state during the first bulk sync operation.

The CPU cores 405, 406, 407 can be general purpose processor cores, such as ARM processor cores, microprocessor without interlocked pipelined stages (MIPS) processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as layer 7 applications (e.g., HTTP load balancing, layer 7 firewalling, and/or layer 7 telemetry), certain InfiniB and channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by a packet processing pipeline circuits 408, 425.

The first packet processing pipeline circuit 408 can be a specialized circuit or part of a specialized circuit using one or more semiconductor chips such as ASICs or FPGAs to implement programmable packet processing pipelines such as the programmable packet processing pipeline 204 of FIG. 2. Some examples include semiconductor chips such as ASICs or FPGAs implementing a P4 pipeline as a fast data path within the networking device.

All data transactions in the semiconductor chip 401, including on-chip memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. Several vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
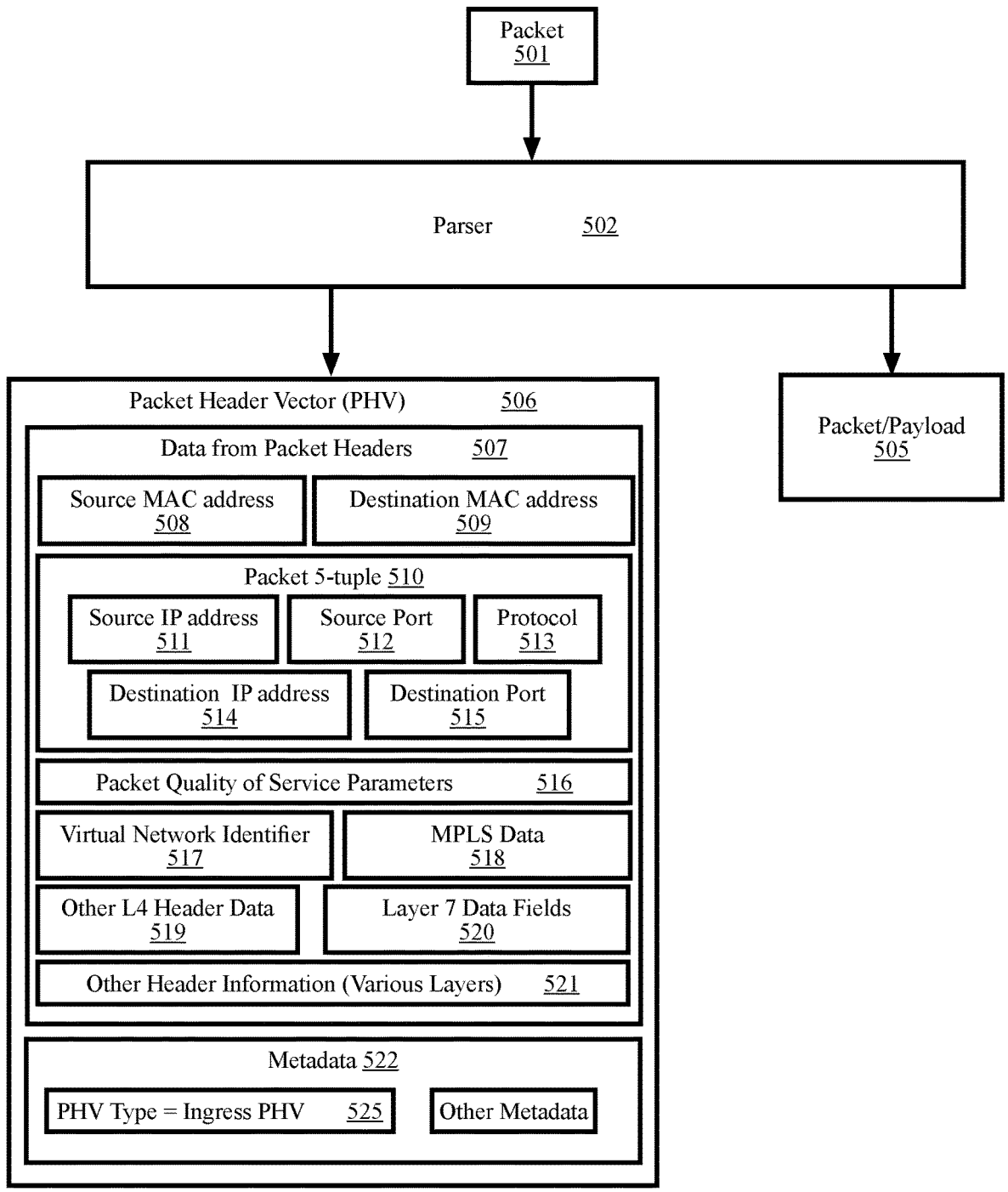
FIG. 5 is a high-level diagram illustrating an example of generating a packet header vector from a packet according to some aspects.

FIG. 5 is a high-level diagram illustrating an example of generating an ingress packet header vector (PHV) 506 from a packet 501 according to some aspects. The PHV 506 is an ingress PHV when it is produced by a parser 502 parsing a packet 501 received via an ingress port as a bit stream. The parser 502 can receive a packet 501 that has layer 2, layer 3, layer 4, and layer 7 headers and payloads. The parser can generate a PHV 506 from packet 501. The packet header vector 506 can include many data fields including data from packet headers 507 and metadata 522. The metadata 522 can include data generated by the networking device such as the hardware port on which the packet 501 was received and the packet timestamps indicating when the packet 501 was received by the networking device, enqueued, dequeued, etc. The metadata 522 can also include data produced by the networking device while processing a packet or assembling a packet. Such metadata 522 can include a PHV type 525 (e.g., "Ingress PHV").

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can include packet header field values such as the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
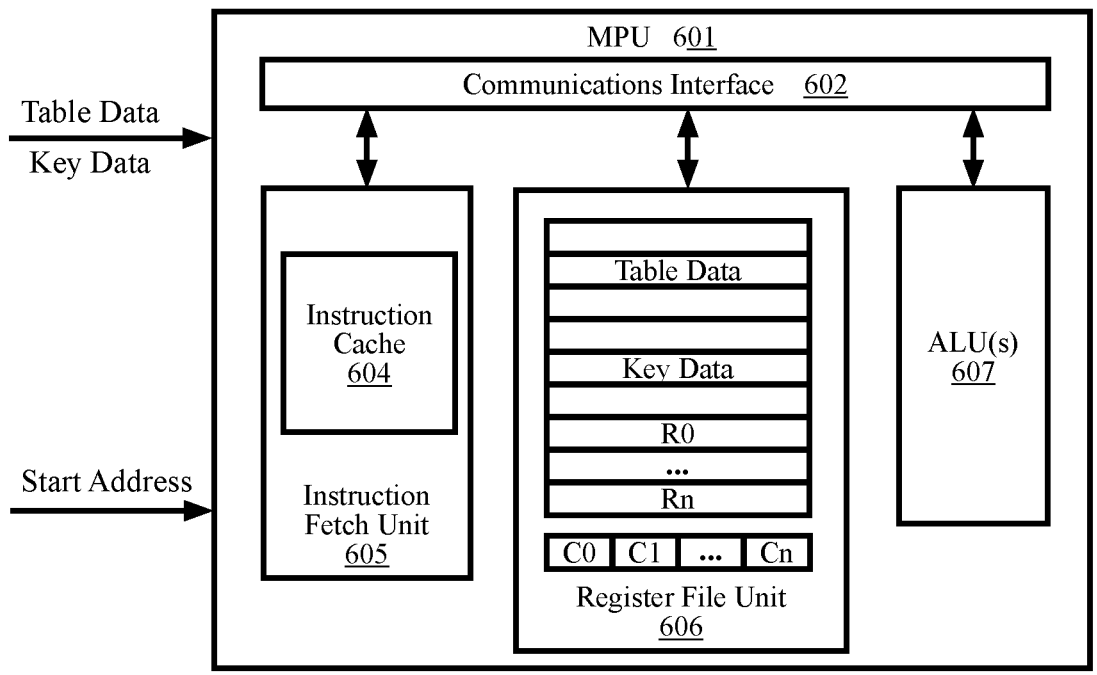
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the examples in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some examples, each register of the register file is 64 bits and may be initially loaded with special metadata values such as hash value from table lookup, packet size, PHV timestamp, programmable table constant and the like.

In some examples, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some examples, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some examples, a single MPU may be configured to execute instructions of a program until completion of the program. In other examples, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
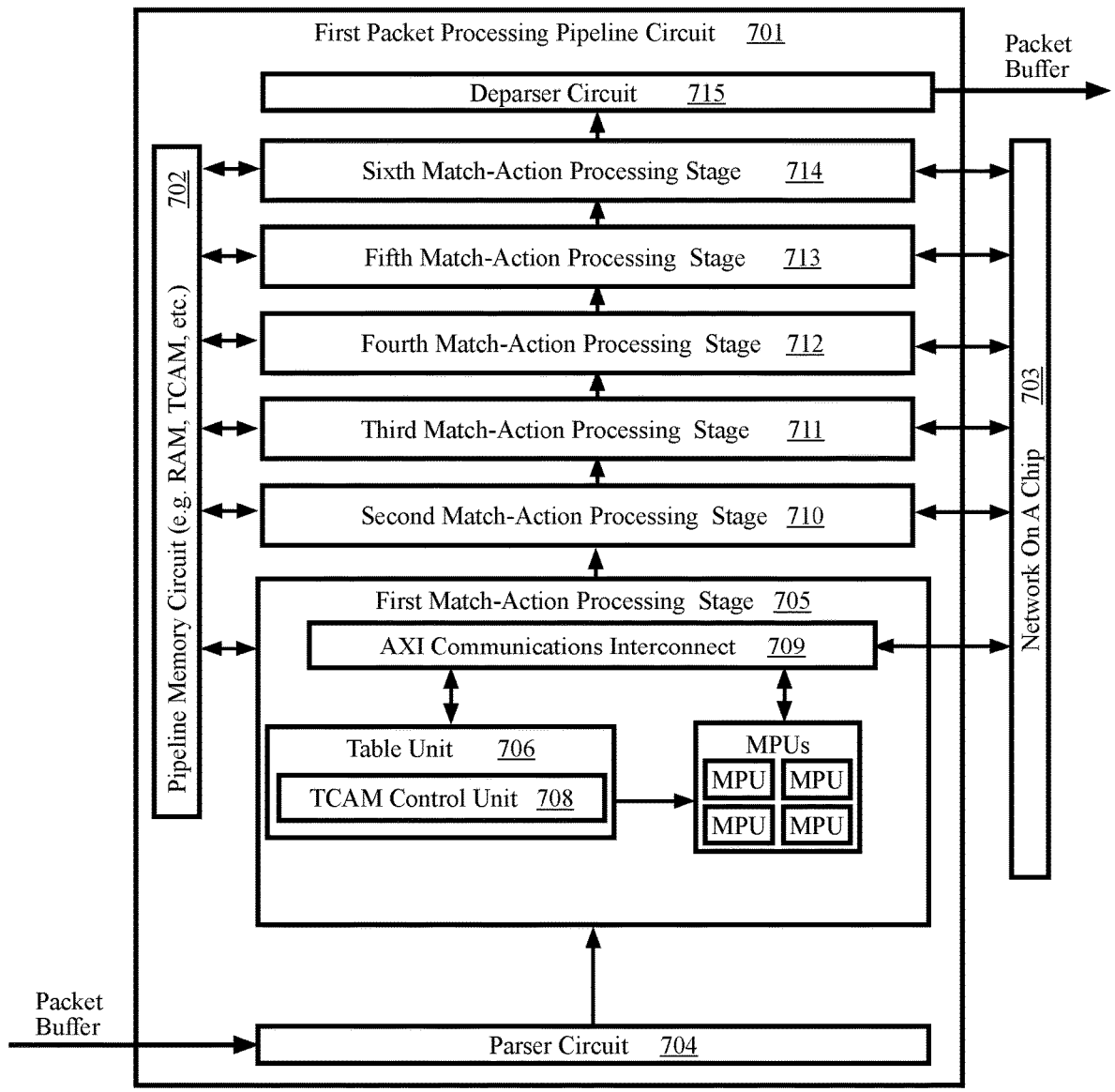
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline circuit in a semiconductor chip. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline circuit 411 implements a match-action pipeline that can have a plurality of stages. For example, a packet entering the pipeline may be first parsed by a parser 704 that is implemented by a parser circuit and that parses the packet according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser circuit that implements a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action processing stages 705, 710, 711, 712, 713, 714 can be the same as the MPU 601 of FIG. 6. Match-action processing stages can have any number of MPUs. The match-action processing stage of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

The second packet processing pipeline circuit 425 includes a match-action pipeline 434. That match-action pipeline 434 can include match-action processing stages such as match-action processing stages 705, 710, 711, 712, 713, 714.

Figure 8:
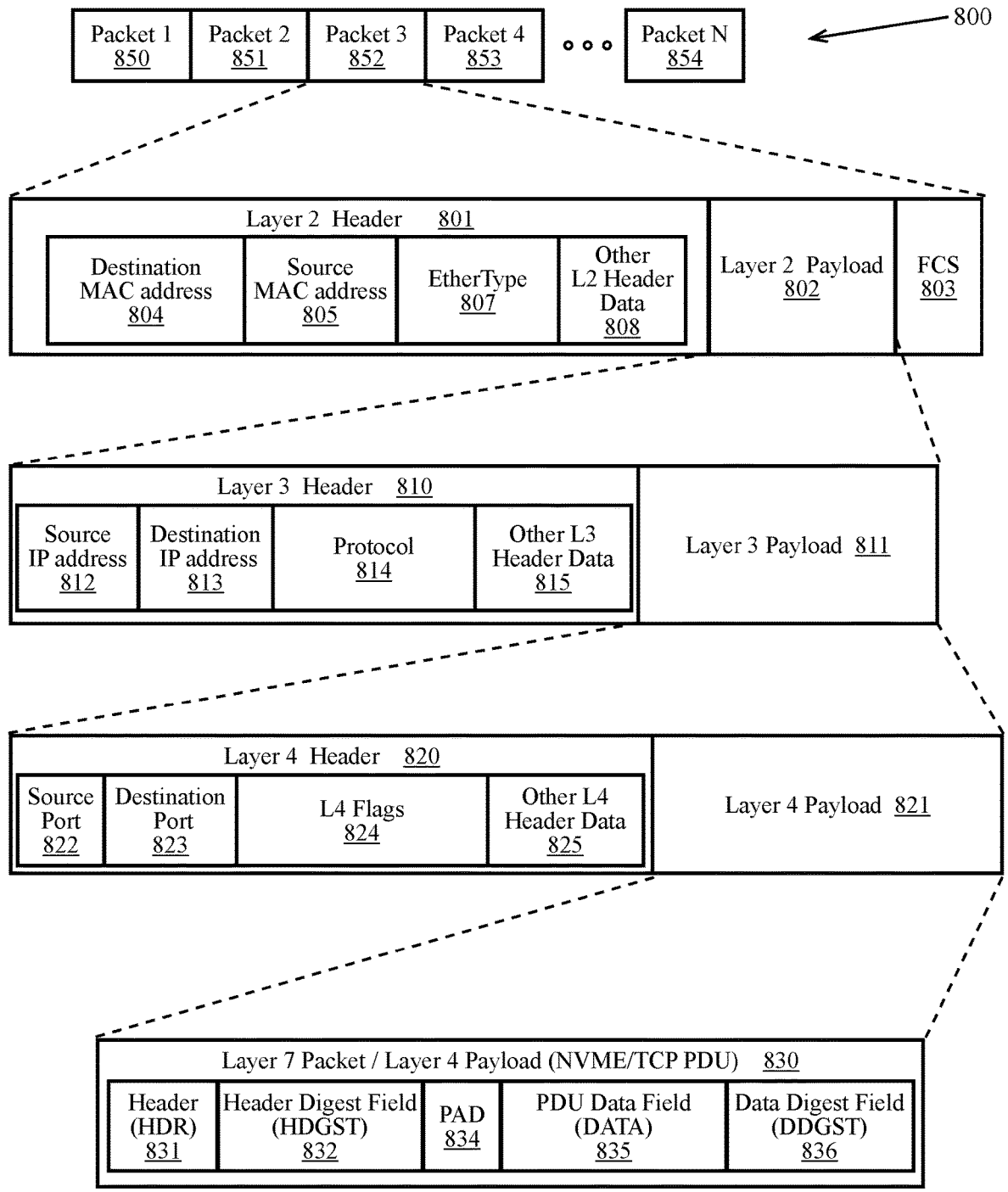
FIG. 8 illustrates packet headers and payloads of packets for network traffic flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a networking device 201 can have MAC addresses. A networking device 201 can have a MAC address that is applied to all or some of the ports. Alternatively, a networking device may have one or more ports that each have their own MAC address. In general, each port can send and receive packets. As such, a port of a networking device can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be networking devices such as networking device 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port indicator 822, destination port indicator 823, layer 4 flags 824, and other layer 4 header data 825. The source port indicator 822 and the destination port indicator 823 can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. The illustrated layer 7 packet is a NVMe/TCP PDU 830. NVM Express, Inc. is a trade organization that provides standards for NVMe communications. Version 1.0 of the NVM Express TCP Transport Specification was published on May 18, 2021 and discloses the contents and structure of NVMe PDUs. An NVMe/TCP PDU can include a header 831, a header digest field 832, a pad 834, a PDU data field 835, and a data digest field 836. The PDU data field 835 can hold the first encrypted block 438. When the PDU data field 835 holds the first encrypted block 438, the data digest field 836 should hold the digest value for the first encrypted block 438. The PDU data field 835 can hold numerous encrypted blocks. When the PDU data field 835 holds numerous encrypted blocks, the data digest field 836 should hold the digest value for the entire PDU data field 835. Such a digest value may be determined from the individual digest values of the numerous encrypted blocks in the PDU data field.

Figure 9:
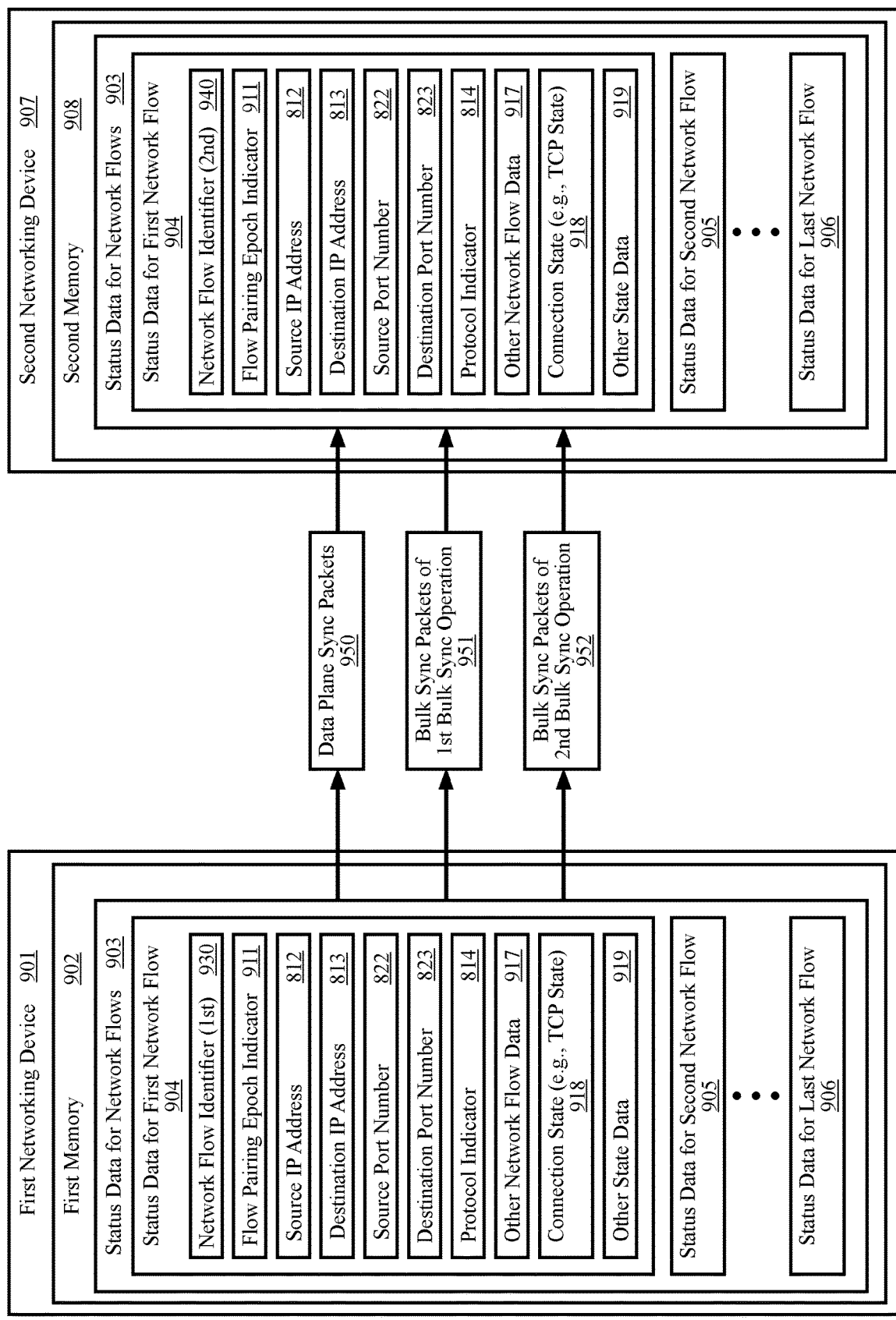
FIG. 9 is a high-level conceptual diagram illustrating syncing of status data between two networking devices according to some aspects.

FIG. 9 is a high-level conceptual diagram illustrating syncing of status data between two networking devices according to some aspects. The first networking device 901 has a first memory 902 that is storing status data for network flows 903. The second networking device 907 has a second memory 908 that is also storing data for network flows 903. The status data for the network flows 903 includes status data for a first network flow 904, status data for a second network flow 905, and status data for a last network flow 906. In the first networking device, the status data for a network flow can include a network flow identifier 930, a flow pairing epoch indicator 911, a source IP address 812, a destination IP address 813, a source port number 822, a destination port number 823, a protocol indicator 814, other network flow data 917, a connection state (e.g., a TCP connection state) 918, and other state data 919. In the second networking device, the status data for the network flow can include a network flow identifier 931, a flow pairing epoch indicator 911, a source IP address 812, a destination IP address 813, a source port number 822, a destination port number 823, a protocol indicator 814, other network flow data 917, a connection state (e.g., a TCP connection state) 918, and other state data 919. The status data for the first network flow 904 has been synchronized between the network devices when both devices have the same status data for the flow except for the network flow identifier 940.

The network flow identifier can be a value that a networking device uses internally for identifying a specific network flow. A network flow identifier may be allocated by a networking device when the status data entry is created for the network flow in the networking device's memory. The networking device may allocate the network flow identifier without coordinating with other devices regarding specifically what identifier to assign for a particular flow. As such, a packet processing pipeline circuit can create entries in the status data without stalling a pipeline stage while coordinating network flow identifier values with other devices. As such, the data plane of one networking device can use data plane sync packets 950 to send data for new network flows to the data plane of the other networking device. The data plane sync packets 950 may also be used to send data for existing flows that change state. The data planes of HA peer devices may continuously exchange data plane sync packets as new flows are created and old flows change state. The expiration of a network flow, which may trigger deleting the status data for the flow, is one possible change of state.

In order to operate in active mode or standby mode in an HA pair, a networking device must obtain the status data for existing network flows from a peer device. The networking device does not immediately have that status data after starting, restarting, or flushing the status data for all network flows from its memory. Data plane syncing can send sync data for a flow to a peer device when the data plane receives a packet for that flow and that packet causes a state change. Some network flows may have network packets that are minutes apart or rarely change the state of the network flow. In such a scenario, data plane syncing of all the flows may take many minutes, perhaps hours, during which the standby node is unable to take over the processing of packets for all the network flows. Such a delay is not acceptable in HA installations. The solution is to perform a first bulk sync operation 951. The control plane of a networking device can package the status data for all the existing network flows in bulk sync packets and can send those packets to the peer device. Data plane syncing can occur before, during, and after the first bulk sync operation 951. However, in order to avoid a race condition, data plane syncing is not performed for previously existing flows during the first bulk sync operation 951. As such, the second networking device has status data for all of the existing network flows after it receives status data for new flows via data plane syncing and receives status data for previously existing flows via the first bulk sync operation 951. When state changes of previously existing flows are not communicated during the first bulk sync operation, some of the status data in the second networking device may be out of date. As such, at least one additional bulk sync operation, such as the second bulk sync operation 952, is performed. Data plane syncing is performed for all network flows after the first bulk sync operation 951. As such, data plane syncing is performed for all network flows during the second bulk sync operation 952.

Figure 10:
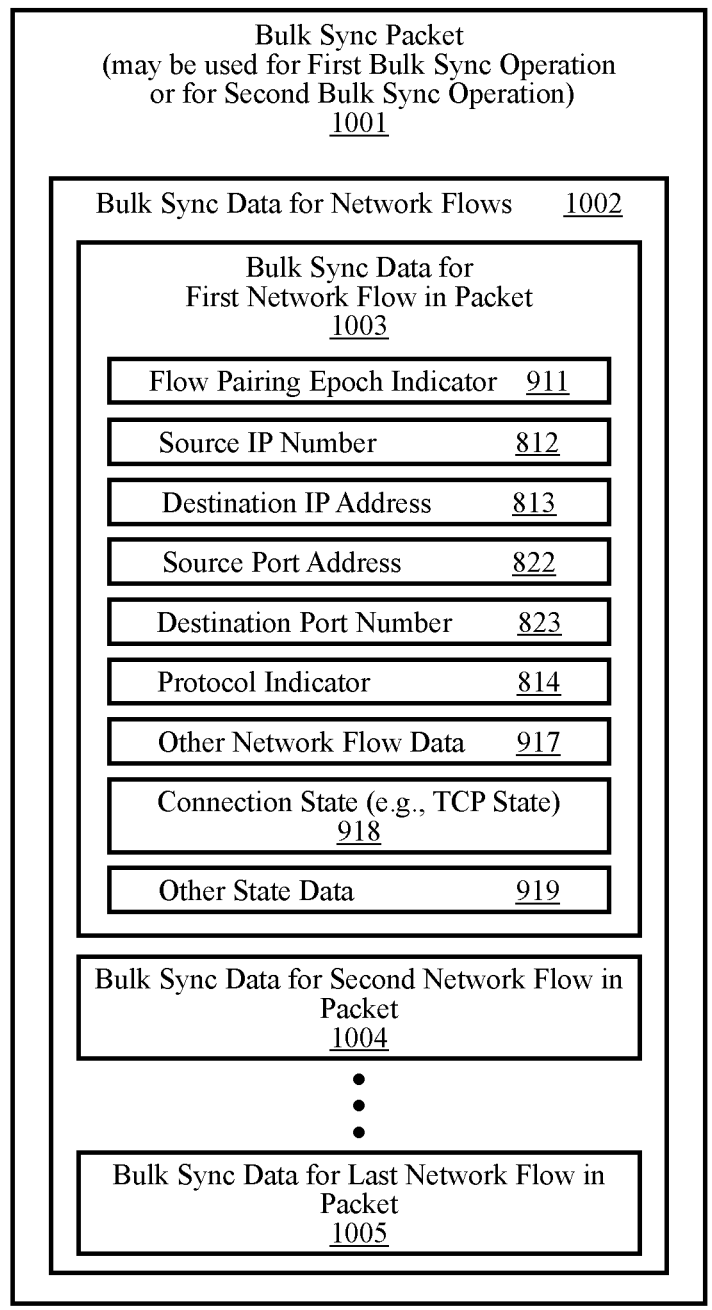
FIG. 10 is a high-level conceptual diagram illustrating a bulk sync packet according to some aspects.

FIG. 10 is a high-level conceptual diagram illustrating a bulk sync packet 1001 according to some aspects. The first bulk sync operation 951 and the second bulk sync operation 952 can use bulk sync packets to pass bulk sync data for network flows 1002 from one networking device to another networking device. The bulk sync packet 1001 may be a TCP or UDP packet that has the bulk sync data for network flows 1002 as a layer 4 payload. The bulk sync data 1002 can include bulk sync data for a first network flow 1003, bulk sync data for a second network flow 1004, and bulk sync data for a last network flow 1005. Comparing the status data for the first network flow 904 to the bulk sync data for the first network flow 1003 shows that the bulk sync data and the status data for a network flow may contain the same fields and data except that the network flow identifier may be omitted from the bulk sync data.

Figure 11:
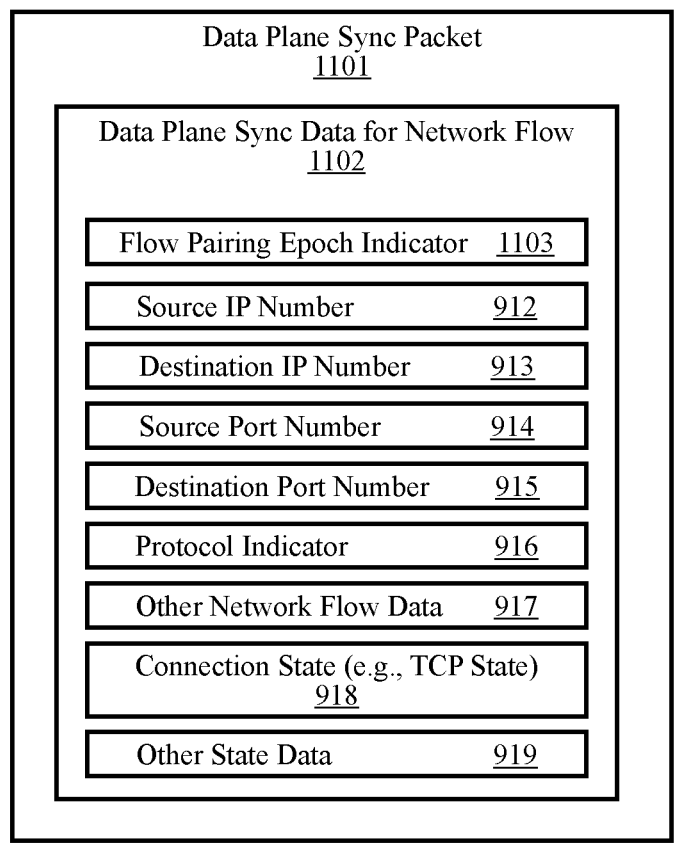
FIG. 11 is a high-level conceptual diagram illustrating a data plane sync packet according to some aspects.

FIG. 11 is a high-level conceptual diagram illustrating a data plane sync packet 1101 according to some aspects. The data plane sync packet is illustrated as containing the data plane sync data for a network flow 1102, but not for multiple network flows. The reason is that the data plane can create a data plane sync packet during one or more steps of processing a network packet. If processing the network packet changes the state of the network flow containing that network packet, then a data plane sync packet 1101 may be immediately created and sent to the peer. As such, data plane syncing, in which the data planes of network devices use data plane sync packets to communicate state changes of network flows, can proceed at the rate at which the data plane processes network packets, which is far faster than the control plane or non-specialized hardware is capable of. The data plane sync packet may be a TCP or UDP packet that has the data plane sync data 1102 as a layer 4 payload. The data plane sync data 1102 has a flow pairing epoch indicator 1103 that may indicate a more recent epoch than the status data for the network flow in the destination networking device (the device to which the packet is sent). The reason is that the status data for the network flow in the source networking device (the device sending the packet) is set to the global pairing epoch indicator 444 when the new state of the network flow is stored in the memory of the source device. Similarly, the flow pairing epoch indicator 1103 in data sync packets equals the global pairing epoch indicator 444. The data plane sync data for the network flow 1102 is shown containing almost all of the fields that are in the status data for the network flow 904. In practice, many fields that are in the status data are unnecessary for communicating the state change and will therefore be omitted. In particular, the network flow identifier 930 may be omitted.

Figure 12:
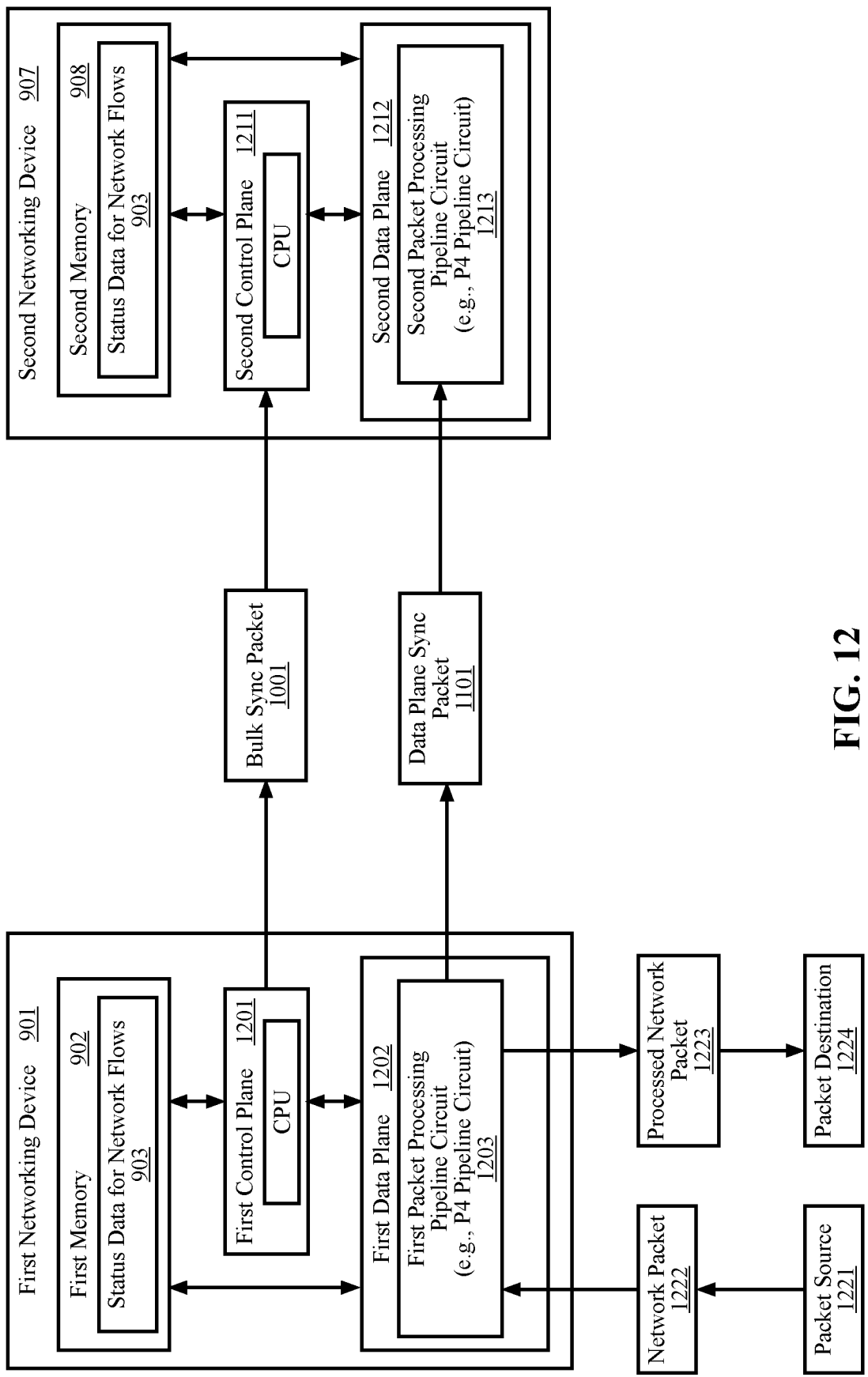
FIG. 12 is a high-level conceptual diagram illustrating a control plane producing bulk sync packets and a data plane producing data plane sync packets according to some aspects.

FIG. 12 is a high-level conceptual diagram illustrating a control plane producing bulk sync packets and a data plane producing data plane sync packets according to some aspects. The first networking device 901 can receive a network packet 1222 from a packet source 1221. The first networking device 901 may process the network packet 1222 entirely within the first data plane 1202 to produce a processed network packet 1223 that is sent to a packet destination 1224. Switches and routers typically process almost every network packet entirely with the data plane. A network flow can contain numerous network packets such as network packet 1222. The first networking device 901 stores status data for the network flow that includes the network packet 1222. If processing the network packet 1222 causes a state change of the network flow, then the first data plane 1202 can store the changed state in the status data for network flows 903 in the first memory 902. The first data plane 1202 can also use a data plane sync packet 1101 to communicate the state change to the second data plane 1212 in the second networking device 907. The second data plane 1212 can use the data plane sync packet 1101 to store the changed state in the status data for network flows 903 in the second memory 908. For example, the second data plane 1212 may copy one or more values from the data plane sync packet into the memory 908.

The first data plane 1202 can have a first packet processing pipeline circuit 1203 that processes the network packet 1222 and creates the data plane sync packet 1101. The second data plane 1212 can have a second packet processing pipeline circuit 1213 that completely processes the data plane sync packet by copying data from the data plane sync packet 1101 to the status data for the network flows 903 in the second memory 908.

The first control plane 1201 can produce a bulk sync packet 1001 while performing a first bulk sync operation or a second bulk sync operation. The bulk sync packet 1001 may be processed in the second networking device 907 by the second control plane 1211. Alternatively, the bulk sync packet may be processed by the second data plane 1212. The format of the bulk sync packet 1001 is simple and predictable which makes bulk sync packets easy for a packet processing pipeline circuit to process. In many scenarios, the second data plane processes the bulk sync packets in order to more rapidly and efficiently sync the status data. Such data plane processing may be important when the CPU in the control plane is busy handling other aspects of the startup. In other scenarios, the control plane has not brought up the data plane enough for the data plane to process bulk sync packets. As such, the control plane may process the bulk sync packets.

Figure 13:
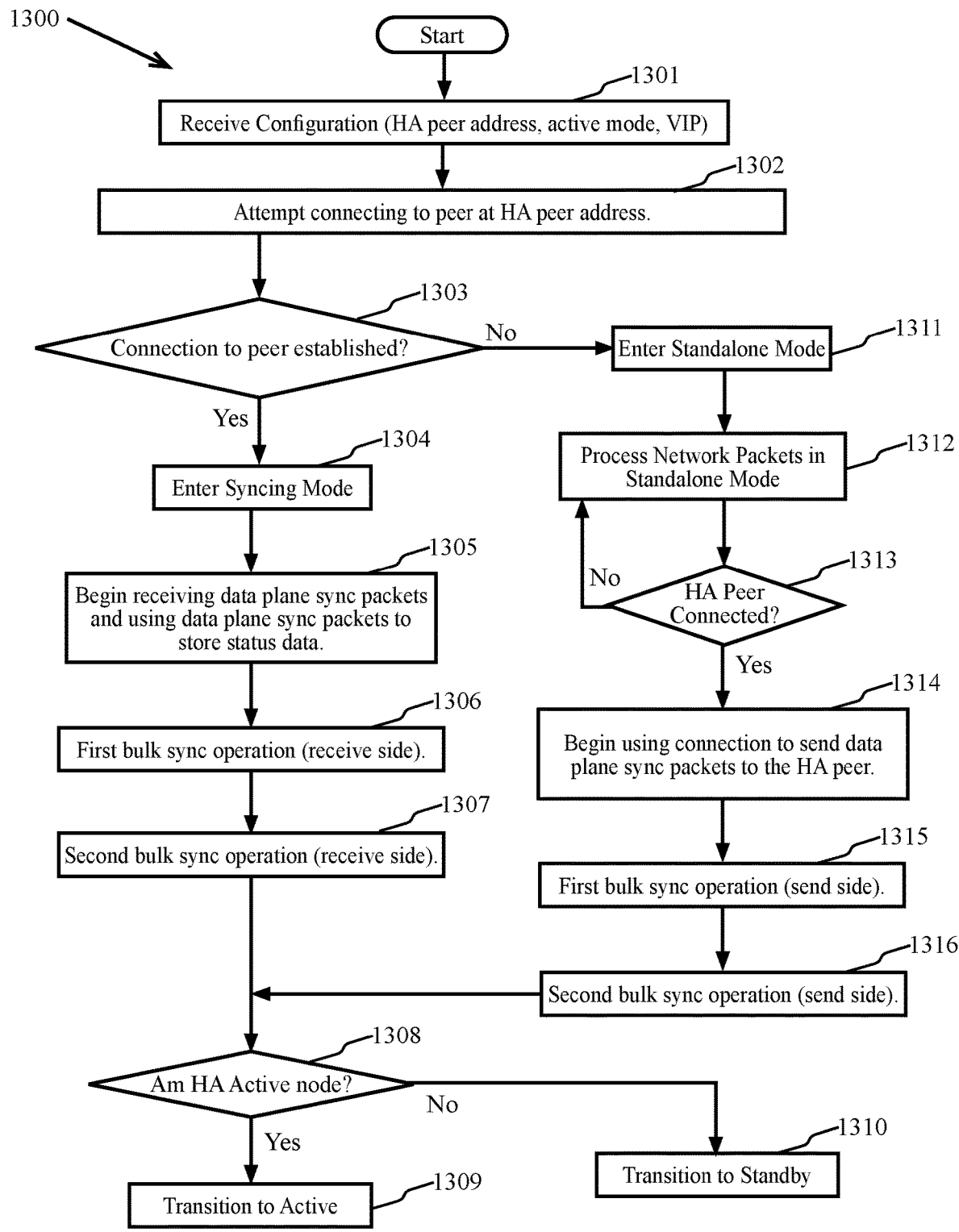
FIG. 13 is a high-level flow diagram illustrating a process that syncs status data between two HA peers according to some aspects.

FIG. 13 is a high-level flow diagram illustrating a process that syncs status data between two HA peers 1300 according to some aspects. The process may be performed by a networking device, such as the first networking device. After the start, at block 1301 the process receives a configuration that may include the networking device's IP address, the HA peer's IP address, the VIP, etc. At block 1302, the process attempts connecting to the peer, such as the second networking device, at the HA peer address. At decision block 1303, the process determines whether the attempt to connect to the peer succeeded. If the connection is established, the process goes to block 1304, otherwise the process goes to block 1311.

At block 1304, the process places the networking device in syncing mode. The device's mode may be set by writing an appropriate value into high availability mode 445. At block 1305, the networking device begins receiving data plane sync packets and using the data plane sync packets to store status data in the memory. At block 1306, the networking device performs the receive side of a first bulk sync operation. At block 1307, the networking device performs the receive side of a second bulk sync operation. At decision block 1308 the networking device determines if it is supposed to be the HA active node. This determination may be made based on configuration data, querying another device, etc. If the networking device is supposed to be the active node, then the process goes to block 1309 and otherwise goes to block 1301. At block 1309, the networking device is transitioned to active mode. At block 1310, the networking device is transitioned to standby mode.

At block 1311, the process sets the networking device to standalone mode. At block 1312, the networking device processes network packets in standalone mode. At decision block 1313, the process determines whether the HA peer has connected. If the connection to the HA peer is established then the process goes to block 1314, otherwise the process loops back to block 1312. At block 1314, the networking device begins using the connection for sending data plane sync packets to the HA peer. At block 1315, the networking device performs the send side of a first bulk sync operation. At block 1316, the networking device performs the send side of a second bulk sync operation. The process then goes to decision block 1308.

Figure 14:
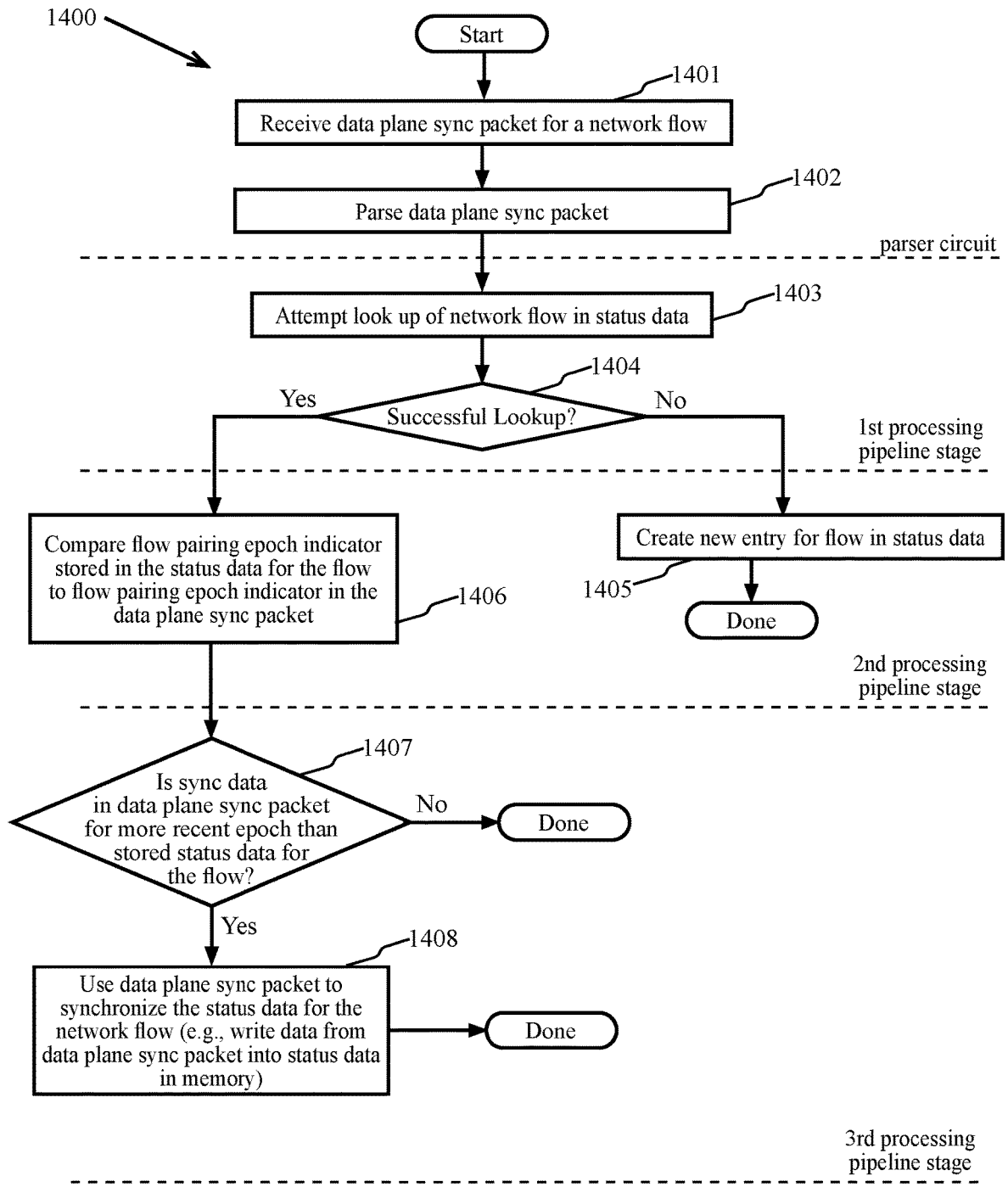
FIG. 14 is a high-level flow diagram illustrating a process that uses data plane sync packets to update the status data in the memory of a networking device according to some aspects.

FIG. 14 is a high-level flow diagram illustrating a process that uses data plane sync packets to update the status data in the memory of a networking device 1400 according to some aspects. The process illustrated in FIG. 14 may be implemented by a packet processing pipeline circuit in the data plane of a networking device. After the start, at block 1401 a data plane sync packet for a network flow is received. At block 1402, the data plane sync packet is parsed. At block 1403, the process attempts to look up the network flow in the data plane sync data 1102 of the data plane sync packet 1101 in the status data. For example, the 5-tuple in the data plane sync data may be used to determine the network flow identifier of the network flow. At decision block 1404, the process determines whether the lookup was successful. A successful lookup indicates an existing network flow. An unsuccessful lookup indicates a new network flow. If the lookup is successful, the process goes to block 1406 and otherwise goes to block 1405. At block 1405, the process creates a new entry in the status data for the network flow before the process is done. At block 1406, the process compares the flow pairing epoch indicator stored in the status data for the flow to the flow pairing epoch indicator in the data plane sync packet. At decision block 1407, the process can use the comparison at block 1406 to determine whether the data plane sync data in data plane sync packet is for a more recent epoch than the data stored status data for the network flow. If decision block 1407 determines that the data plane sync data is for an epoch that is not more recent than the status data for the network flow, then the process is done. Otherwise, the process goes to block 1408. At block 1408, the process can use the data plane sync packet for synchronizing the status data for the network flow. For example, the data plane may write data from the data plane sync packet into status data in the memory.

FIG. 14 indicates the stages of a packet processing pipeline circuit that may execute the different blocks in the process. The parser circuit may perform block 1402. A first packet processing pipeline stage may perform block 1403 and decision block 1404. A second packet processing pipeline stage may perform block 1405 or block 1406. A first packet processing pipeline stage may perform decision block 1407 and block 1408.

Figure 15:
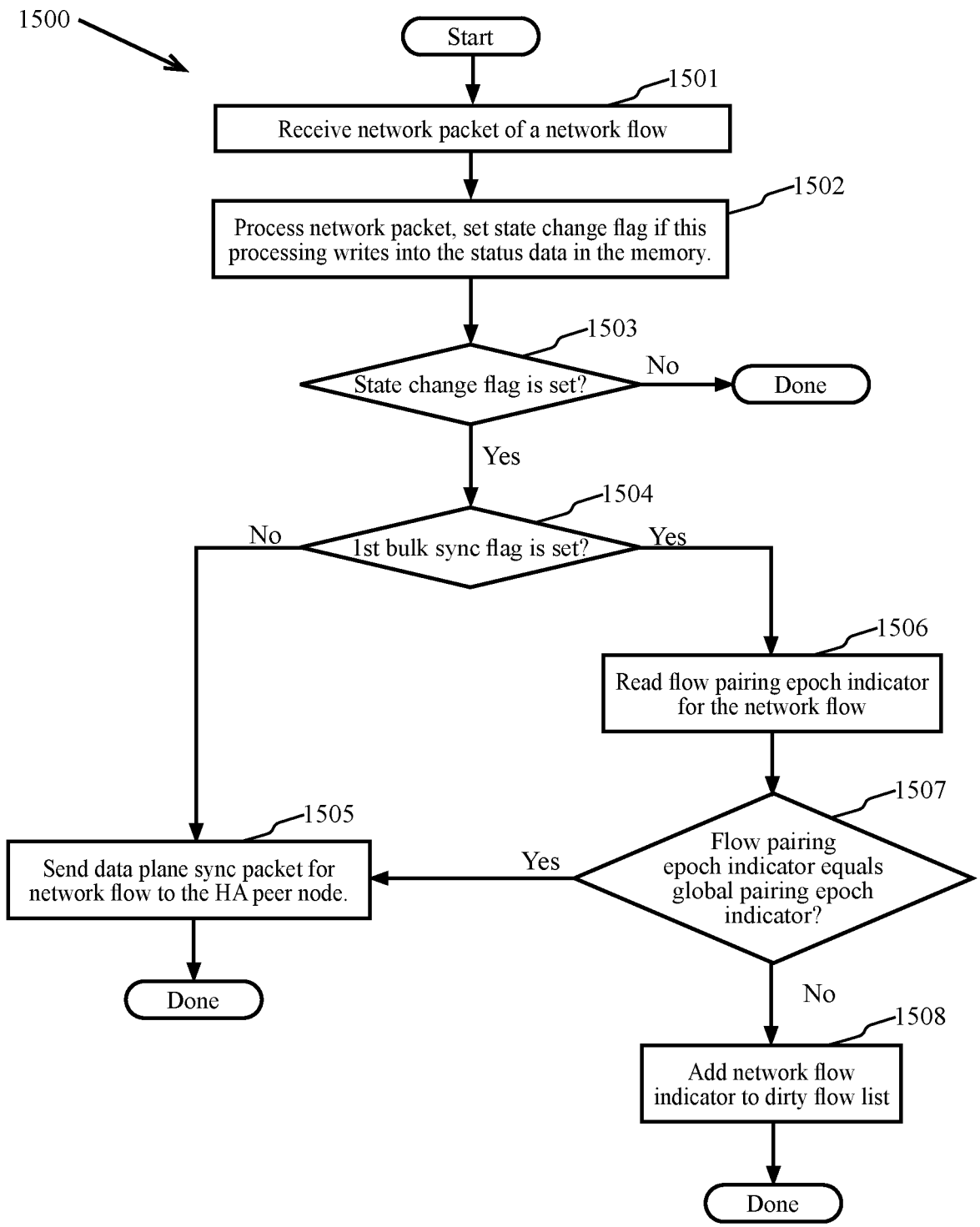
FIG. 15 is a high-level flow diagram illustrating a process that a packet processing pipeline circuit can implement, can send data plane sync packets, and can add network flow indicators to a dirty flow list according to some aspects.

FIG. 15 is a high-level flow diagram illustrating a process that a packet processing pipeline circuit can implement, can send data plane sync packets, and can add network flow indicators to a dirty flow list 1500 according to some aspects. A pipeline circuit is specifically designed for processing network packets and can create new packets, such as data sync packets, upon the occurrence of events such as changes to a flow's status data. The process illustrated in FIG. 15 may therefore be implemented by a packet processing pipeline circuit. After the start, at block 1501 the process can receive a network packet that is one of the packets in a network flow. At block 1502, the packet can be processed by the data plane. The data plane can set a state change flag if the processing of the network packet writes into the status memory, which is an aspect of a state change for the network flow that includes the network packet. For example, a pipeline stage that writes into the status data in the memory can also set a state change flag. More than one processing stage may set the state change flag. At decision block 1503, the process can check the state change flag. If the state change flag is not set, the process is done, otherwise the process moves to decision block 1504. At decision block 1504, the process can check whether the first bulk sync flag is set. The first bulk sync flag can be set when the first bulk sync operation begins and can be cleared when the first bulk sync operation completes. If the first bulk sync flag is set at decision block 1504, the process goes to block 1506, otherwise the process goes to block 1505. At block 1505, the process can send a data plane sync packet for the network flow to the HA node before the process is done. At block 1506, the process can read the flow pairing epoch indicator for the network flow. The flow pairing epoch indicator for the network flow can be read from the status data for the network flows 903. At decision block 1507, the process can check whether the flow pairing epoch indicator for the network flow equals the global pairing epoch indicator. If the flow pairing epoch indicator for the network flow equals the global pairing epoch indicator, then the network flow is a new network flow that should not be included in the first bulk sync operation. Here, a new network flow is a network flow that began after the first bulk sync operation started. The first steps of a first bulk sync operation can include setting the global pairing epoch to indicate a new epoch, and setting the first bulk sync flag to indicate that a first bulk sync operation is active. The process can go to block 1505 if the flow pairing epoch indicator for the network flow equals the global pairing epoch indicator at decision block 1507 and otherwise can go to block 1508. At block 1508, the process can add the network flow to the dirty flow list 449. The dirty flow list indicates network flows that changed state during a first bulk sync operation.

Figure 16:
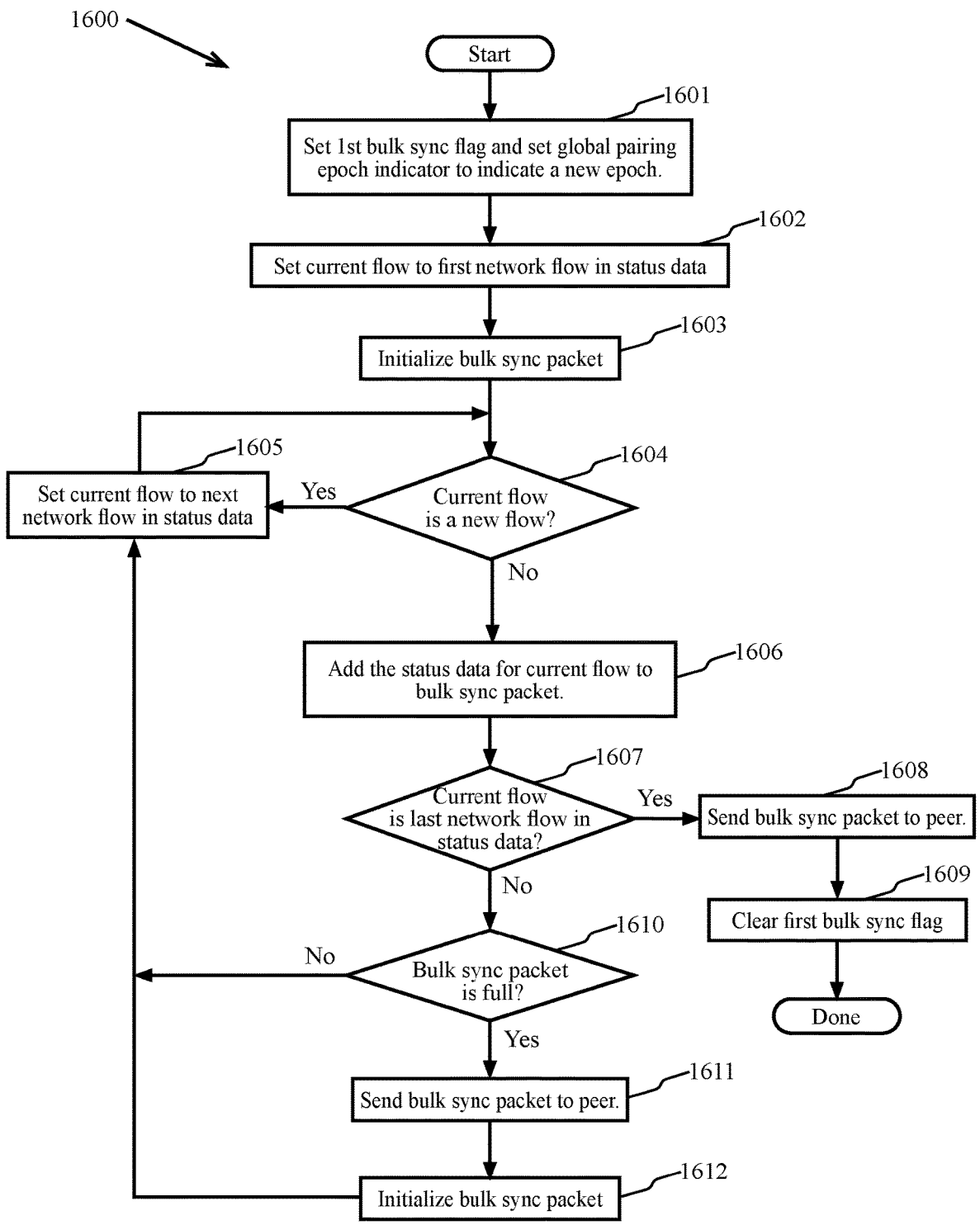
FIG. 16 is a high-level flow diagram illustrating a process that performs the sending side of a first bulk sync operation according to some aspects.

FIG. 16 is a high-level flow diagram illustrating a process that performs the sending side of a first bulk sync operation 1600 according to some aspects. After the start, at block 1601 the process can set the first bulk sync flag and set the global pairing epoch indicator to indicate a new epoch. For example, the global pairing epoch may be indicated by an integer (epoch 1, epoch 2, etc.) in which case the integer is incremented. Alternatively, the global pairing epoch indicator may be a timestamp that indicates the start time of the epoch, in which case the global pairing epoch indicator is set to indicate the current time. At block 1602, the process can set current flow to indicate the first network flow in the status data for network flows 903. At block 1603, the process can initialize a bulk sync packet. At decision block 1604, the process can check whether the current flow is a new flow. A flow is a new flow when it has a flow pairing epoch indicator 911 that is not less than the global pairing epoch indicator 444. A flow is an old flow when is has a flow pairing epoch indicator that is less than the global pairing epoch indicator. As such, old flows predate setting the global pairing epoch indicator to a new value. The process can go to block 1605 if the current flow is a new flow at decision block 1604 and otherwise can go to block 1606. At block 1605, current flow is set to the next flow in the status data for network flows. At block 1606, the process can add the status data for current flow to the bulk sync packet. At decision block 1607, the process can check whether current flow indicates the last network flow in the status data for network flows 903. The process goes to block 1608 if the current flow indicates the last network flow in the status data for network flows and otherwise goes to decision block 1610. At block 1608, the bulk sync packet is sent to the peer (e.g., the second networking device 111). At block 1609, the process can clear the first bulk sync flag before the process is done. At decision block 1610, the process can check whether the bulk sync packet is full. The bulk sync packet can be full when its payload (e.g., bulk sync data for network flows 1002) reaches or passes a threshold size or contains data for a predetermined number of network flows (e.g., maxFlowsInBulkSyncPacket). The process can move to block 1611 if the bulk sync packet is full at decision block 1610 and otherwise can move to block 1605. At block 1611, the bulk sync packet is sent to the peer. At block 1612, the process can initialize another bulk sync packet before looping back to block 1605.

Figure 17:
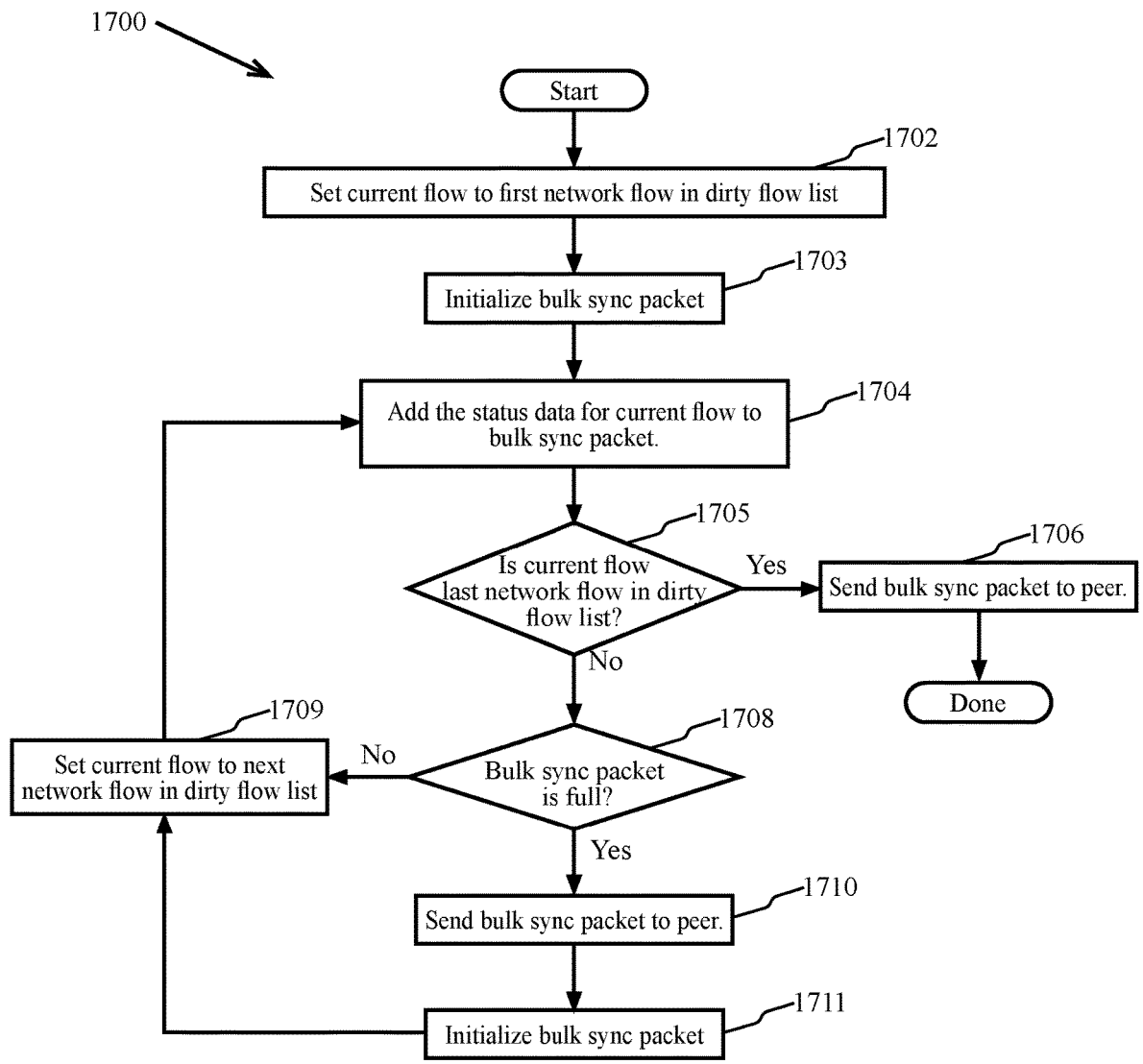
FIG. 17 is a high-level flow diagram illustrating a process that performs the sending side of a second bulk sync operation according to some aspects.

FIG. 17 is a high-level flow diagram illustrating a process that performs the sending side of a second bulk sync operation 1700 according to some aspects. At block 1702, the process can set current flow to indicate the first network flow in the dirty flow list 449. At block 1703, the process can initialize a bulk sync packet. At block 1704, the process can add the status data for current flow to the bulk sync packet. At decision block 1705, the process can check whether current flow indicates the last network flow in the dirty flow list. The process goes to block 1706 if current flow indicates the last network flow in the dirty flow list and otherwise goes to decision block 1708. At block 1706, the bulk sync packet is sent to the peer (e.g., the second networking device 111) before the process is done. At decision block 1708, the process can check whether the bulk sync packet is full. The bulk sync packet can be full when its payload (e.g., bulk sync data for network flows 1002) reaches or passes a threshold size or contains data for a predetermined number of network flows (e.g., maxFlowsInBulkSyncPacket). The process can move to block 1710 if the bulk sync packet is full at decision block 1708 and otherwise can move to block 1709. At block 1710, the bulk sync packet is sent to the peer. At block 1711, the process can initialize another bulk sync packet before moving to block 1709. At block 1709, the process can set current flow to the next network flow in the dirty flow list.

Figure 18:
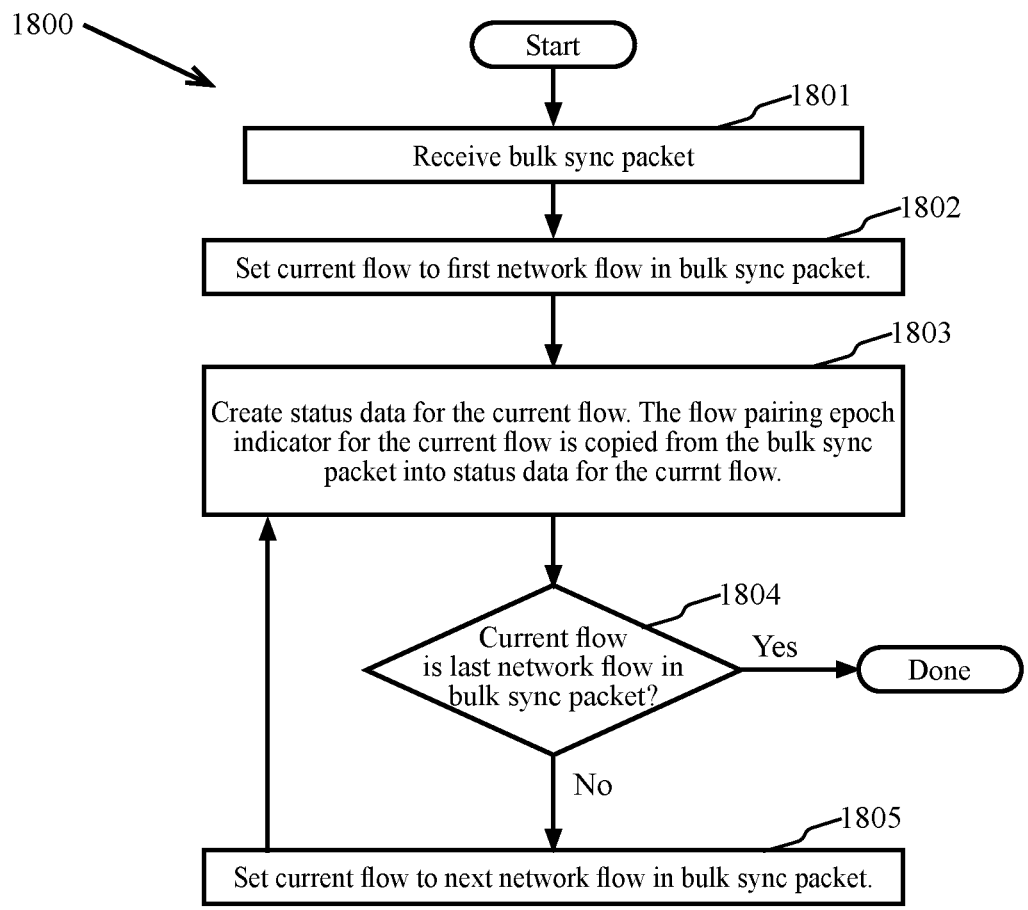
FIG. 18 is a high-level flow diagram illustrating a process that performs the receiving side of a first bulk sync operation according to some aspects.

FIG. 18 is a high-level flow diagram illustrating a process that performs the receiving side of a first bulk sync operation 1800 according to some aspects. After the start, the process can receive a bulk sync packet at block 1801. At block 1802, the process can set current flow to the first network flow in the bulk sync packet. At block 1803, the process can create status data for the current flow. The flow pairing epoch indicator for the current flow is copied from the bulk sync packet into status data for the current flow. Here, it is assumed that the first bulk sync operation only contains status data for network flows that are not already known by the networking device that is performing the receive side of the first bulk pairing operation, which is a reasonable assumption that removes the need to check whether the status data for the network flows already includes an entry for the current flow. In implementations where the assumption is not valid, a check may be incorporated such that an existing entry in the status data for the network flows is only overwritten by data from a more recent epoch. At decision block 1804, the process can check whether the current flow is the last network flow in the bulk sync packet. The process is done if the current flow is the last network flow in the bulk sync packet, otherwise the process goes to block 1805. At block 1805, the process can set current flow to next network flow in the bulk sync packet before looping back to block 1803.

Figure 19:
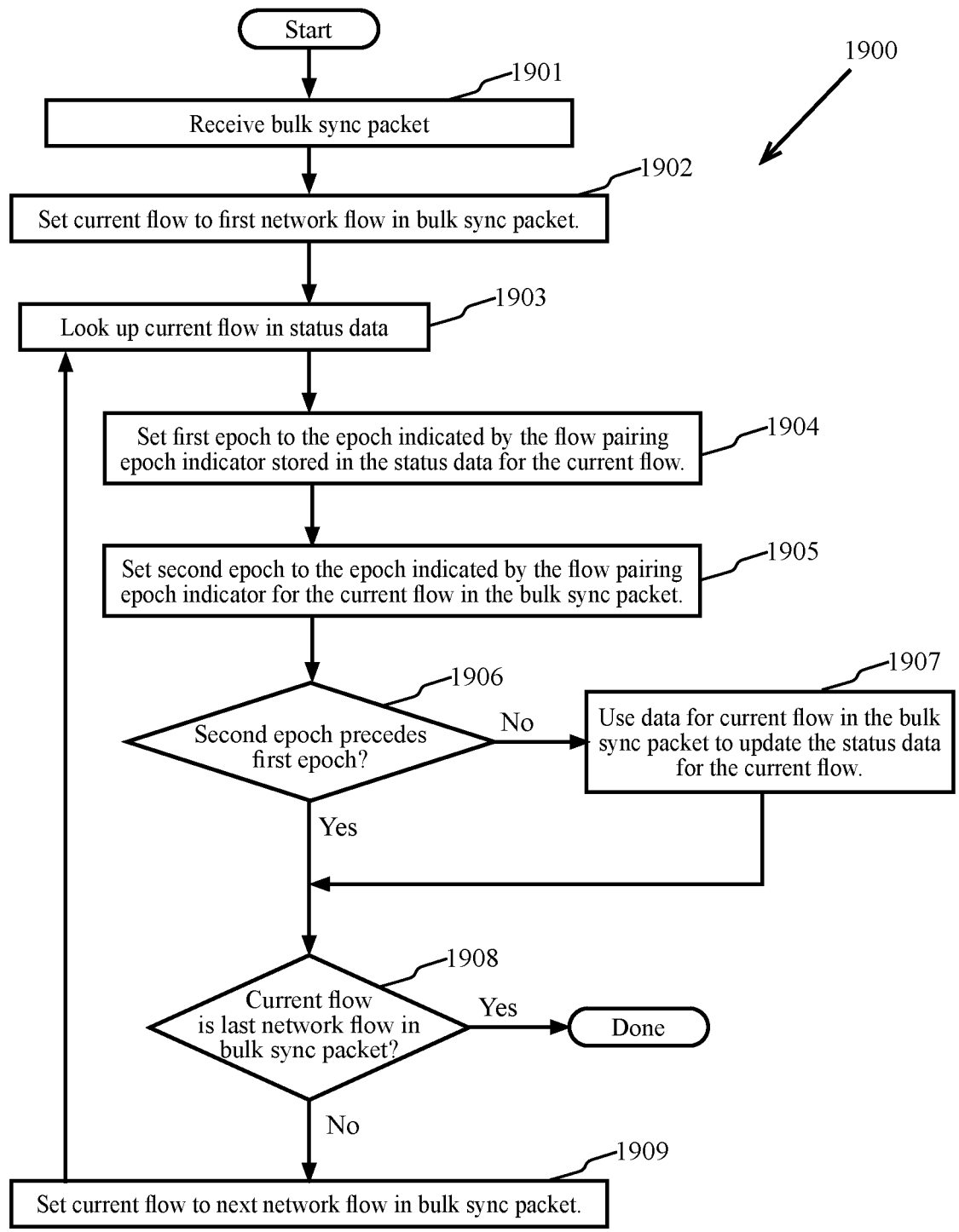
FIG. 19 is a high-level flow diagram illustrating a process that performs the receiving side of a second bulk sync operation according to some aspects.

FIG. 19 is a high-level flow diagram illustrating a process that performs the receiving side of a second bulk sync operation 1900 according to some aspects. The process illustrated in FIG. 19 may also be used for a third, fourth, or subsequent bulk sync operation. After the start, the process receives a bulk sync packet at block 1901. At block 1902, the process can set current flow to the first network flow in the bulk sync packet. At block 1903, the process can look up current flow in the status data for the network flows 903. At block 1904, the process can set first epoch to the epoch indicated by the flow pairing epoch indicator stored in the status data for the current flow. At block 1905, the process can set second epoch to the epoch indicated by the flow pairing epoch indicator for the current flow in the bulk sync packet. At decision block 1906, the process can check whether second epoch precedes first epoch. If second epoch precedes first epoch at decision block 1906, the process goes to decision block 1908 and otherwise goes to block 1907. At block 1907, the process can use the data for current flow in the bulk sync packet to update the status data for the current flow in the status data for network flows 903. At decision block 1908, the process can check whether the current flow is the last network flow in the bulk sync packet. The process is done if the current flow is the last network flow in the bulk sync packet at decision block 1908 and otherwise the process goes to block 1909. At block 1909, the process can set current flow to the next network flow in the bulk sync packet before looping back to block 1903.

Figure 20:
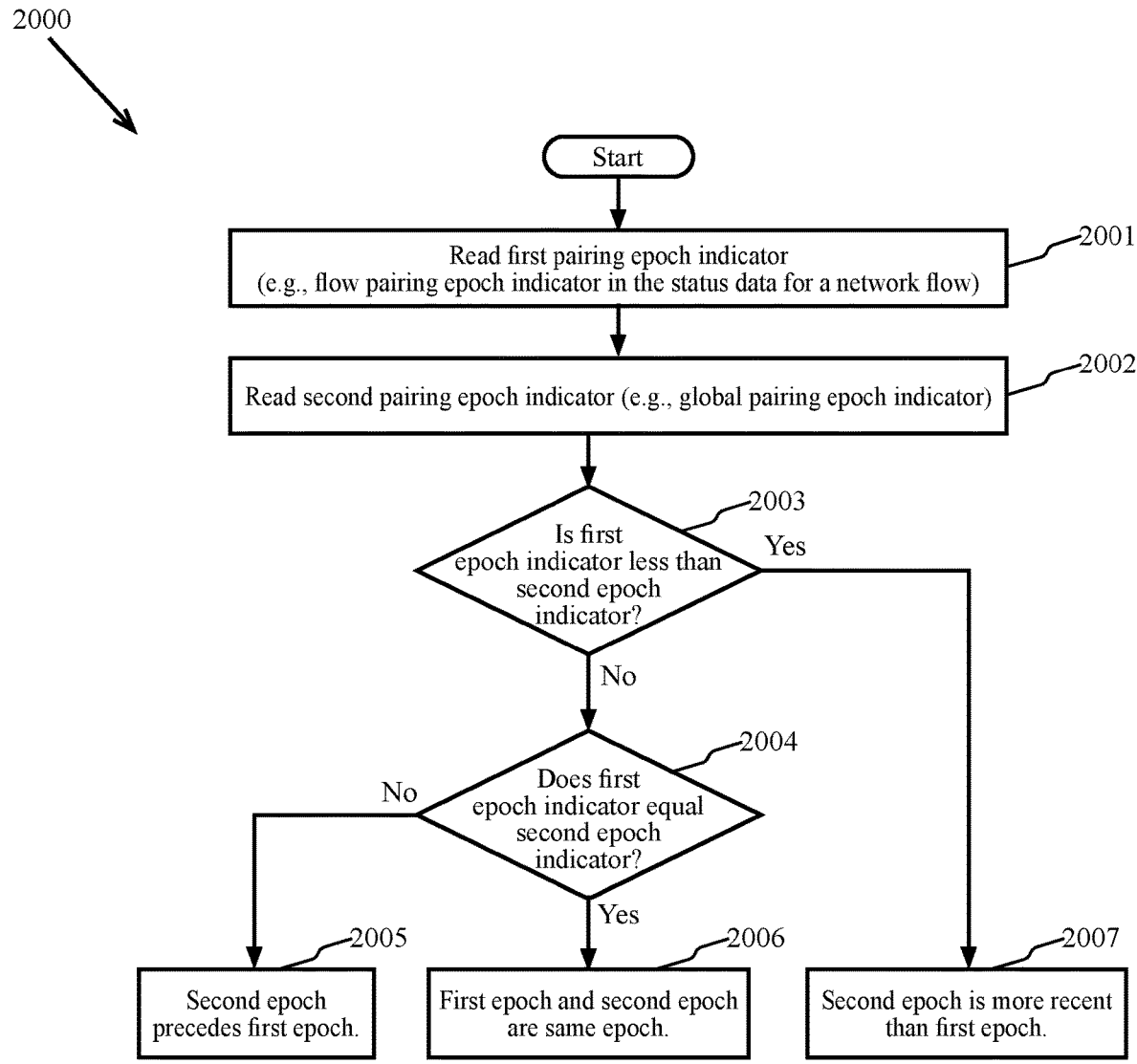
FIG. 20 is a flow diagram illustrating a process that uses epoch indicators to determine whether one pairing epoch is more recent than another pairing epoch according to some aspects.

In block 1907, the data for a second pairing epoch overwrites data for a first pairing epoch. The data for the first pairing epoch is the status data for the network flow that is stored in the status data for network flows 440, 903 in the memory 432 of networking device 430. The data for the second pairing epoch is the sync data for the network flow that is included in the bulk sync data for network flows 1002 of the bulk sync packet 1001. Decision block 1906 uses flow pairing epoch indicators to determine whether the second pairing epoch precedes the first pairing epoch. As such, the flow pairing epoch indicators are used to prevent data of a second pairing epoch for a network flow from overwriting status data of a first pairing epoch for the network flow when the first pairing epoch is more recent than the second pairing epoch FIG. 20 is a flow diagram illustrating a process that uses epoch indicators to determine whether one pairing epoch is more recent than another pairing epoch 2000 according to some aspects. A pairing indicator may be in integer indicating a pairing epoch (e.g., epoch 1, epoch 2, etc.), may be a timestamp indicating the time at which an epoch began, etc. After the start, at block 2001, the process can read a first pairing epoch indicator (e.g., flow pairing epoch indicator in the status data for a network flow). At block 2002, the process can read a second pairing epoch indicator (e.g., global pairing epoch indicator). At decision block 2003, the process can determine whether the first epoch indicator is less than second epoch indicator. A timestamp is less than another timestamp if it indicates an earlier time than the other timestamp. The process can move to block 2007 if the first epoch indicator is less than second epoch indicator at decision block 2003 and otherwise can move to decision block 2004. At block 2007, the process has determined that the second epoch is more recent than the first epoch. At decision block 2004, the process can determine whether the first epoch indicator equals the second epoch indicator. A timestamp equals another timestamp if it indicates the same time as the other timestamp. The process can move to block 2006 if the first epoch indicator equals the second epoch indicator at decision block 2004 and otherwise can move to block 2005. At block 2005, the process has determined that the second epoch precedes the first epoch. At block 2006, the process has determined that the first epoch and second epoch are same the epoch. When the first epoch indicator is the global pairing epoch indicator then the first epoch is the current pairing epoch. If the second pairing indicator is less than the global pairing epoch indicator then the second epoch predates the current pairing epoch.

Figure 21:
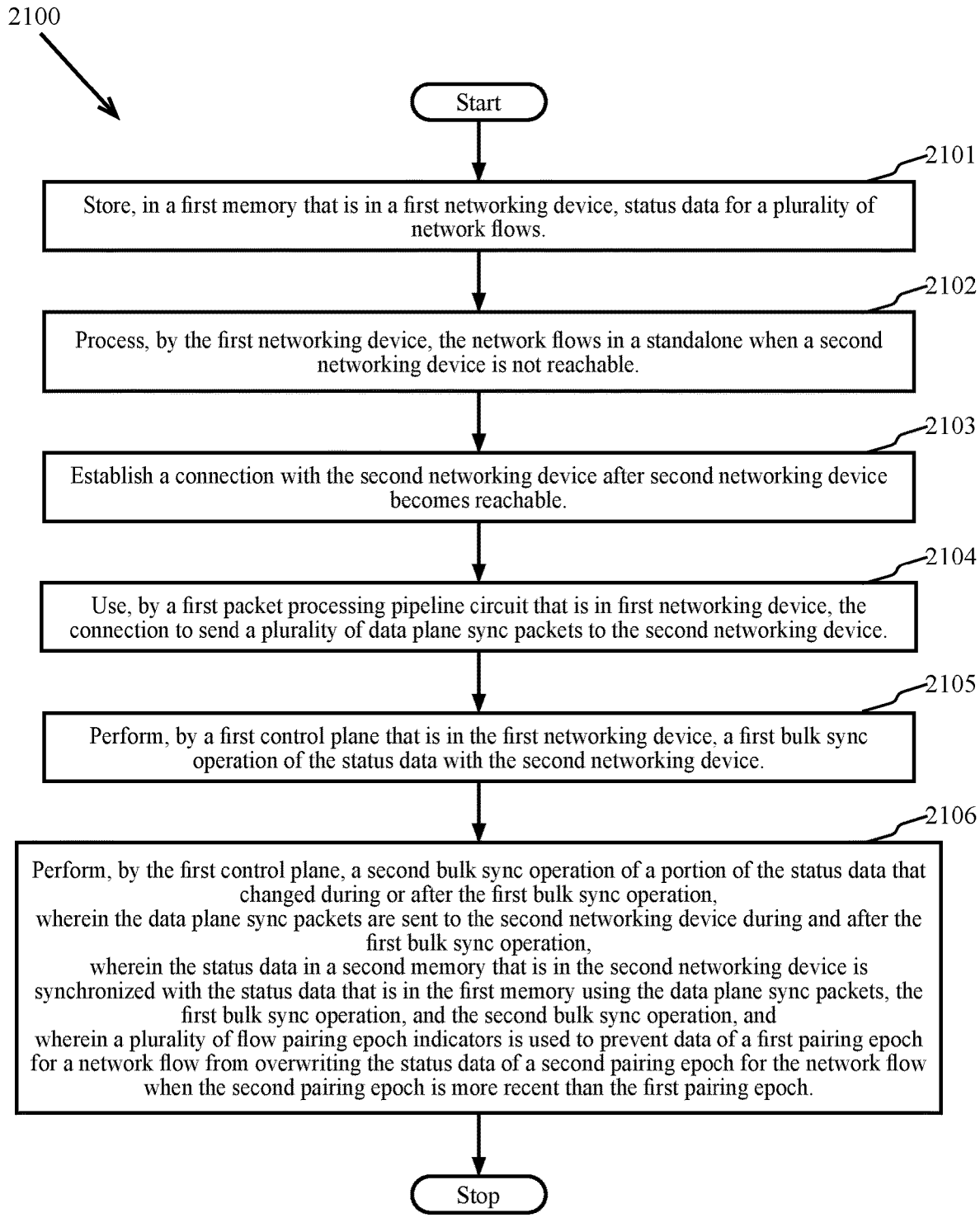
FIG. 21 is a high-level flow diagram illustrating a method for high availability node pairing without incurring connection drops according to some aspects.

FIG. 21 is a high-level flow diagram illustrating a method for high availability node pairing without incurring connection drops 2100 according to some aspects. After the start, at block 2101, the method can store, in a first memory that is in a first networking device, status data for a plurality of network flows. At block 2102, the second networking device is not reachable the first networking device can process the network flows in a standalone mode. At block 2103, the method can establish a connection with the second networking device after the second networking device becomes reachable. At block 2104, the method can use, by a first packet processing pipeline circuit that is in the first networking device, the connection to send a plurality of data plane sync packets to the second networking device. At block 2105, the method can perform, by a first control plane that is in the first networking device, a first bulk sync operation of the status data with the second networking device. At block 2106, the method can perform, by the first control plane, a second bulk sync operation of a portion of the status data that changed during or after the first bulk sync operation, wherein the data plane sync packets are sent to the second networking device during and after the first bulk sync operation, wherein the status data in a second memory that is in the second networking device is synchronized with the status data that is in the first memory using the data plane sync packets, the first bulk sync operation, and the second bulk sync operation, and wherein a plurality of flow pairing epoch indicators is used to prevent data of a first pairing epoch for a network flow from overwriting the status data of a second pairing epoch for the network flow when the second pairing epoch is more recent than the first pairing epoch.

Figure 22:
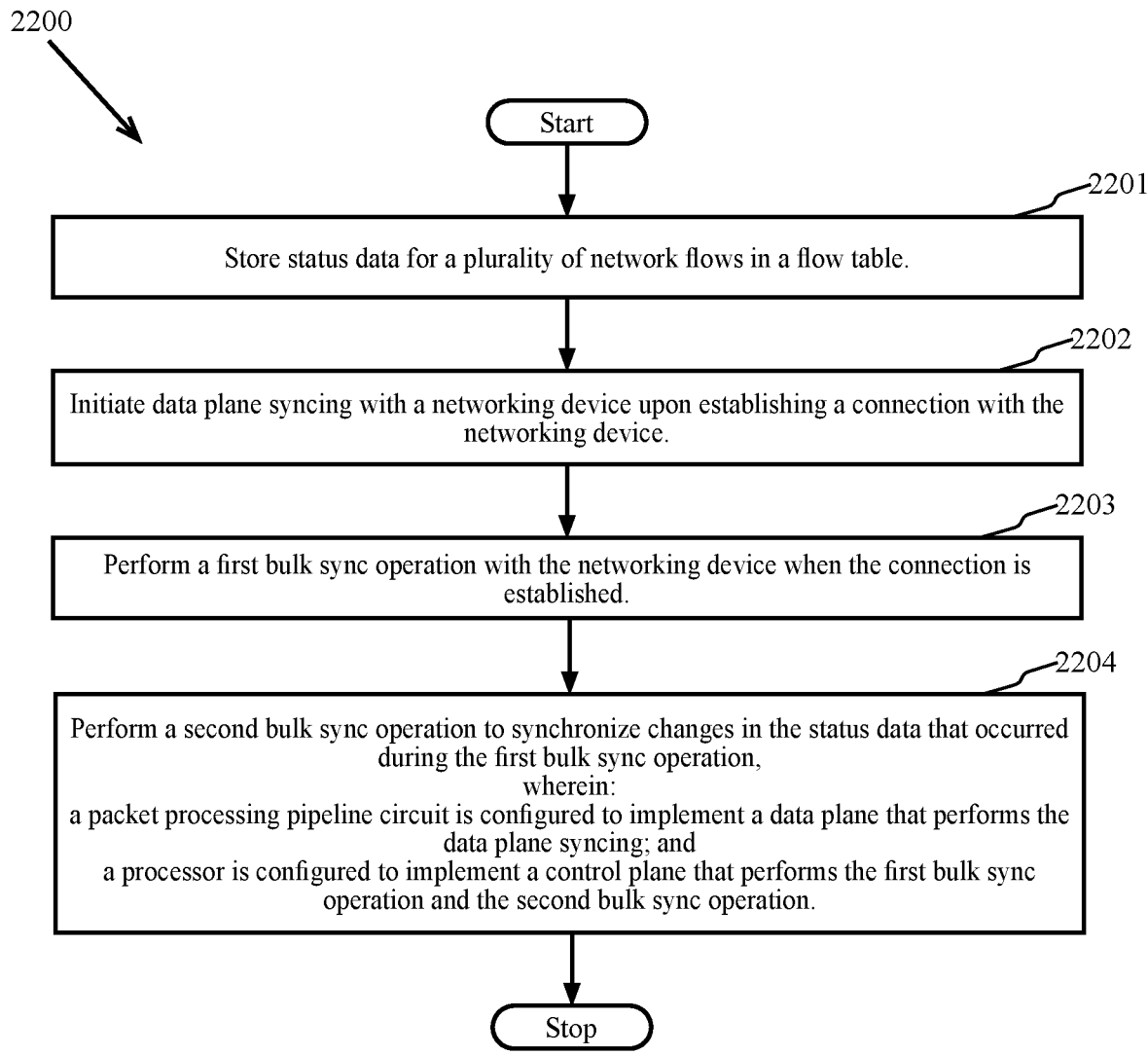
FIG. 22 is another high-level flow diagram illustrating a method for high availability node pairing without incurring connection drops according to some aspects.

FIG. 22 is another high-level flow diagram illustrating a method for high availability node pairing without incurring connection drops according to some aspects. After the start, at block 2201 the method can store status data for a plurality of network flows in a flow table. At block 2202, the method can initiate data plane syncing with a networking device upon establishing a connection with the networking device. At block 2203, the method can perform a first bulk sync operation with the networking device when the connection is established. At block 2204, the method can perform a second bulk sync operation to synchronize changes in the status data that occurred during the first bulk sync operation, wherein a packet processing pipeline circuit is configured to implement a data plane that performs the data plane syncing, and a processor is configured to implement a control plane that performs the first bulk sync operation and the second bulk sync operation.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The networking device may be a single IC device (e.g., fabricated on a single substrate) or the networking device may be a system that includes multiple IC devices connected by, for example, a printed circuit board (PCB). The interfaces may include network interfaces (e.g., Ethernet interfaces and/or InfiniB and interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, a computer program product can include a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A networking device comprising:
a packet processing pipeline circuit configured to implement a data plane; and
a processor configured to implement a control plane;
wherein the packet processing pipeline circuit and the processor are further configured to implement synchronization of status data that involves:
the data plane initiating data plane syncing with a second networking device upon establishing a connection with the second networking device;
the control plane performing a first bulk sync operation when the connection is established; and
the control plane performing a second bulk sync operation to synchronize changes in the status data that occurred during the first bulk sync operation.

2. The networking device of claim 1, wherein data plane syncing includes sending a data plane sync packet to the second networking device, the data plane sync packet including the status data of a network flow.

3. The networking device of claim 1, wherein:
data plane syncing includes receiving a data plane sync packet that includes the status data of a network flow; and
the data plane is configured to store the status data of the network flow in a flow table entry in a flow table.

4. The networking device of claim 2, wherein the control plane is configured to use the first bulk sync operation and the second bulk sync operation to store the status data for a plurality of network flows in a plurality of flow table entries in a flow table.

5. The networking device of claim 1, wherein:
a global pairing epoch indicator indicates a current pairing epoch;
the status data for a network flow indicates a pairing epoch; and
the first bulk sync operation synchronizes the status data for the network flow when the current pairing epoch is more recent than the pairing epoch.

6. The networking device of claim 5, wherein:
data plane syncing includes sending data plane sync packets to the second networking device; and
the data plane sync packets that are sent during or after the first bulk sync operation indicate a second pairing epoch that is more recent than the pairing epoch.

7. The networking device of claim 1, wherein a data plane sync packet is sent to the second networking device before the first bulk sync operation begins.

8. The networking device of claim 1, wherein data plane syncing includes sending data plane sync packet to the second networking device before, during, and after the first bulk sync operation.

9. The networking device of claim 1, wherein data plane syncing includes sending data plane sync packet to the second networking device before, during, and after the second bulk sync operation.

10. The networking device of claim 1, wherein a state change of a network flow during the first bulk sync operation is not synchronized via data plane syncing when the network flow was established before the connection is established.

11. The networking device of claim 10, wherein a second state change of the network flow during the second bulk sync operation is synchronized via data plane synchronization.

12. The networking device of claim 1, wherein data plane syncing synchronizes the status data of a plurality of network flows that are established after the connection is established.

13. The networking device of claim 1, wherein:
the networking device is configured to set a global pairing epoch indicator to a new value after establishing the connection;
the status data includes a plurality of flow pairing epoch indicators for a plurality of network flows;
network flows that predate setting the global pairing epoch indicator to the new value are identified by comparing the global pairing epoch indicator and the flow pairing epoch indicators;
the first bulk sync operation synchronizes the status data for the network flows that predate setting the global pairing epoch indicator to the new value; and
the first bulk sync operation does not synchronize the status data for the network flows that do not predate setting the global pairing epoch indicator to the new value.

14. The networking device of claim 13, wherein before, during, and after the first bulk sync operation, the packet processing pipeline circuit is configured to use data plane sync packets to synchronize the status data for the network flows that do not predate setting the global pairing epoch indicator to the new value.

15. The networking device of claim 1, wherein the network device is configured to enter a high availability mode upon completion of the second bulk sync operation.

16. A networking device comprising:
a packet processing pipeline circuit configured to implement a data plane; and
a processor configured to implement a control plane;
wherein the packet processing pipeline circuit and the processor are further configured to implement synchronization of a flow table that involves:
storing status data for a plurality of network flows in the flow table;
the data plane initiating data plane syncing with a second networking device upon establishing a connection with the second networking device;
the control plane performing a first bulk sync operation with the second networking device when the connection is established; and
the control plane performing a second bulk sync operation to synchronize changes in the status data that occurred during the first bulk sync operation.

17. The networking device of claim 16, wherein the networking device is configured to process the network flows in a standalone mode before the connection is established.

18. The networking device of claim 16, wherein the networking device enters a high availability mode upon completion of the second bulk sync operation.

19. A method comprising:
storing status data for a plurality of network flows in a flow table;
initiating data plane syncing with a networking device upon establishing a connection with the networking device;
performing a first bulk sync operation with the networking device when the connection is established; and
performing a second bulk sync operation to synchronize changes in the status data that occurred during the first bulk sync operation,
wherein:
a packet processing pipeline circuit is configured to implement a data plane that performs the data plane syncing; and
a processor is configured to implement a control plane that performs the first bulk sync operation and the second bulk sync operation.

20. The method of claim 19, further including:
entering an active mode or a standby mode after the second bulk sync operation.

* * * * *